(12) United States Patent
Chung et al.

(10) Patent No.: US 8,265,706 B2
(45) Date of Patent: Sep. 11, 2012

(54) MOBILE TERMINAL AND DISPLAY CONTROLLING METHOD THEREOF

(75) Inventors: Jin Woo Chung, Seoul (KR); Sang-Soo Song, Seoul (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 12/724,654

(22) Filed: Mar. 16, 2010

(65) Prior Publication Data

US 2011/0053650 A1    Mar. 3, 2011

(30) Foreign Application Priority Data

Aug. 26, 2009   (KR) ........................ 10-2009-0079152

(51) Int. Cl.
*H04W 88/02* (2009.01)
(52) U.S. Cl. .................... 455/566; 358/406; 345/173
(58) Field of Classification Search .................. 715/728, 715/810; 345/173, 168; 455/566; 358/406; 235/426; 705/14.5
See application file for complete search history.

(56) References Cited

U.S. PATENT DOCUMENTS

2010/0001958 A1 *   1/2010   Lu et al. .......................... 345/168
2010/0275122 A1 *   10/2010  Buxton et al. .................. 715/728

* cited by examiner

*Primary Examiner* — Phuoc Doan
(74) *Attorney, Agent, or Firm* — Lee, Hong, Degerman, Kang & Waimey

(57) ABSTRACT

A mobile terminal and display controlling method thereof are disclosed. The present invention includes detecting whether the position of the keypad is shifted to cover a partial display region of the display unit, if it is detected that the position of the keypad is shifted, changing a normal display mode into a control display mode, and if the control display mode is entered, performing a display operation corresponding to the control display mode in a different display region except the partial display region. Accordingly, in case that a keypad is located to cover a display region of a display unit in part, the present invention enables a display function to be effectively performed in the rest of the display region except the partially covered display region.

16 Claims, 52 Drawing Sheets

(a)

(b)

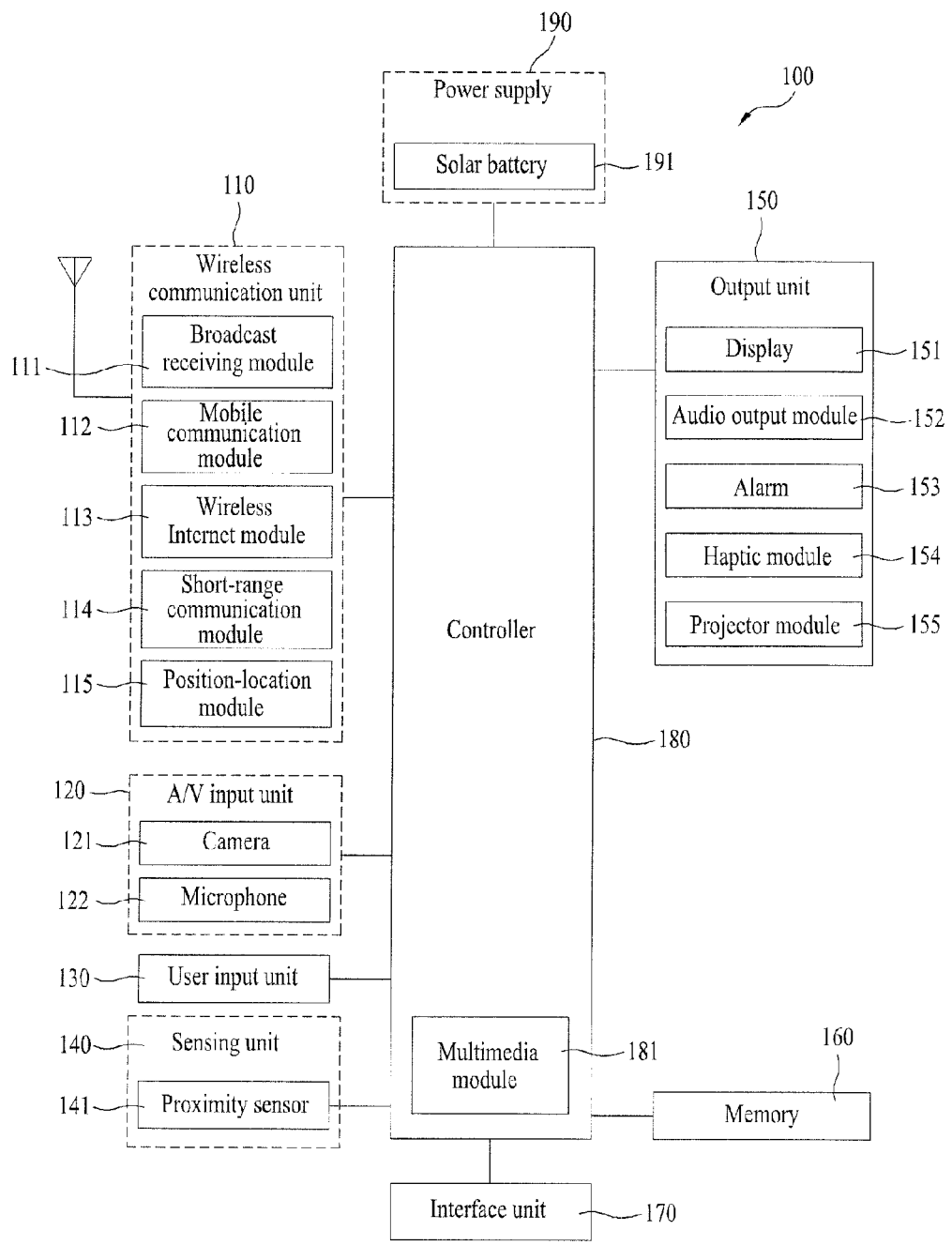

FIG. 2A
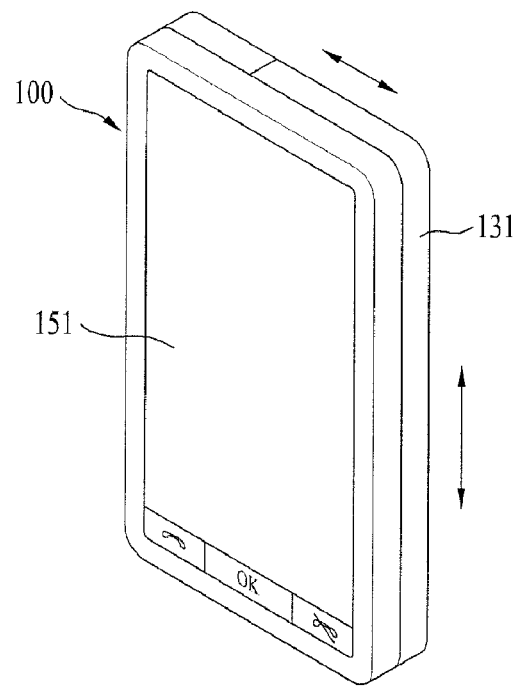
(a)
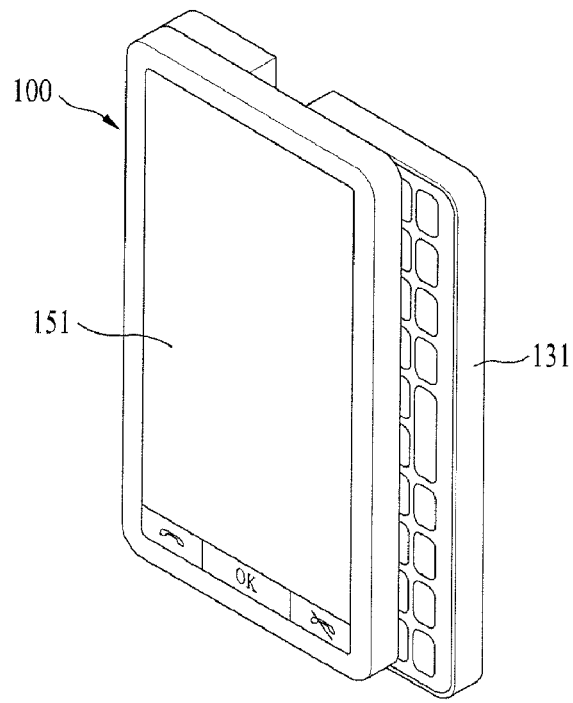
(b)

FIG. 8B
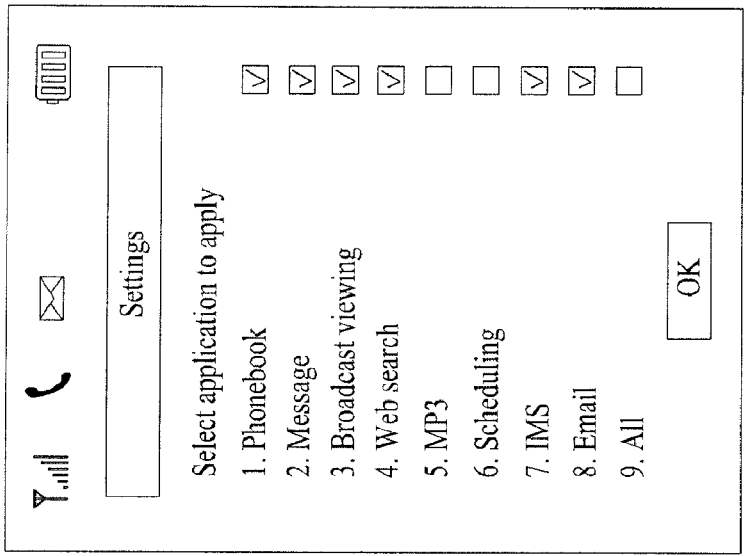
(b)
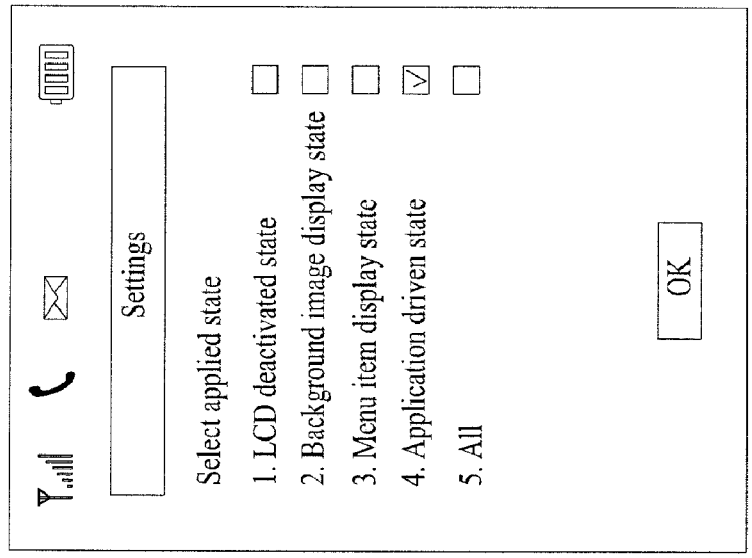
(a)

FIG. 8C
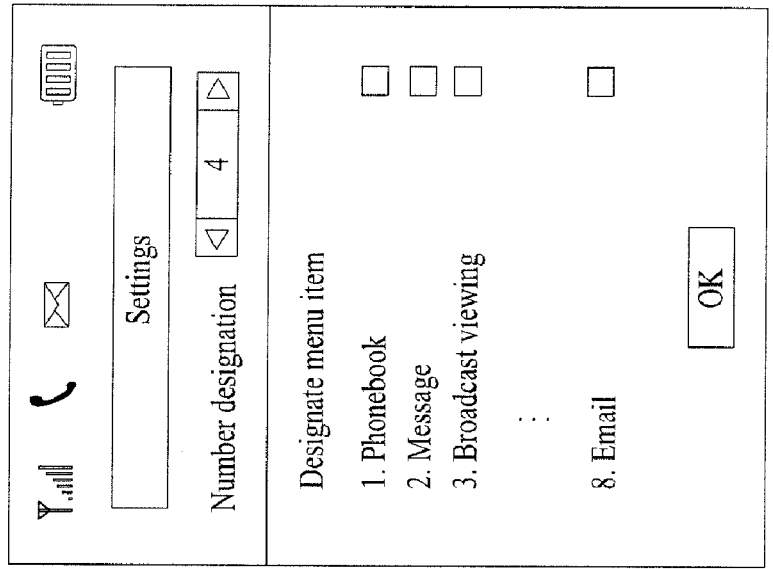
(b)
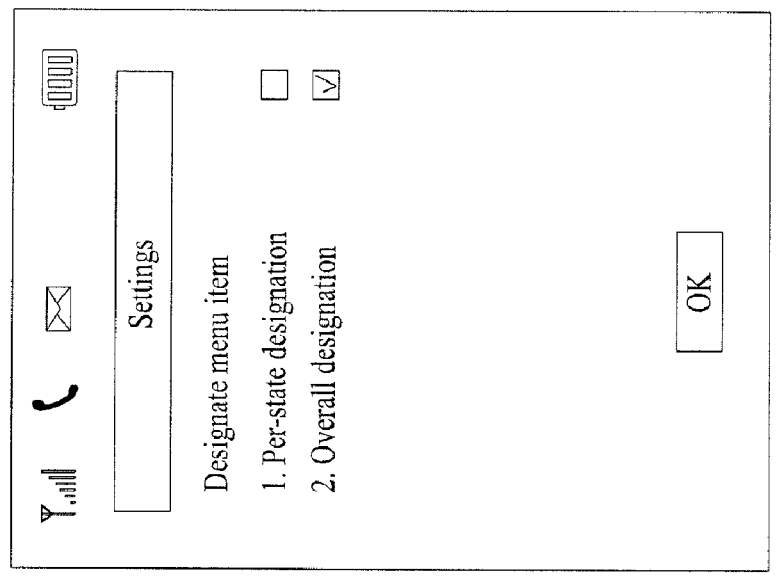
(a)

FIG. 9A
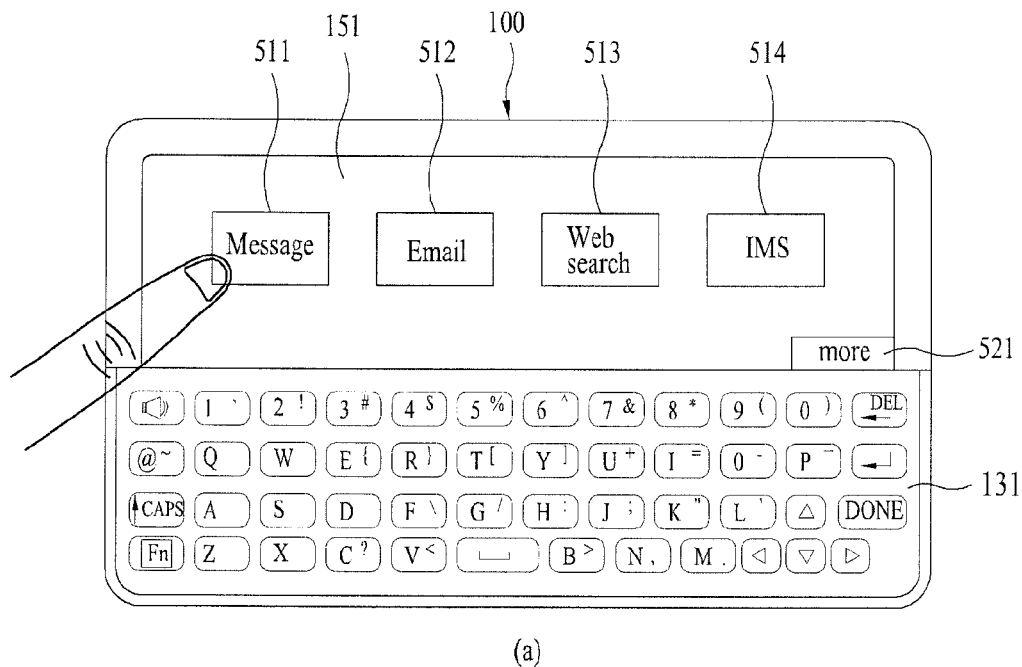
(a)
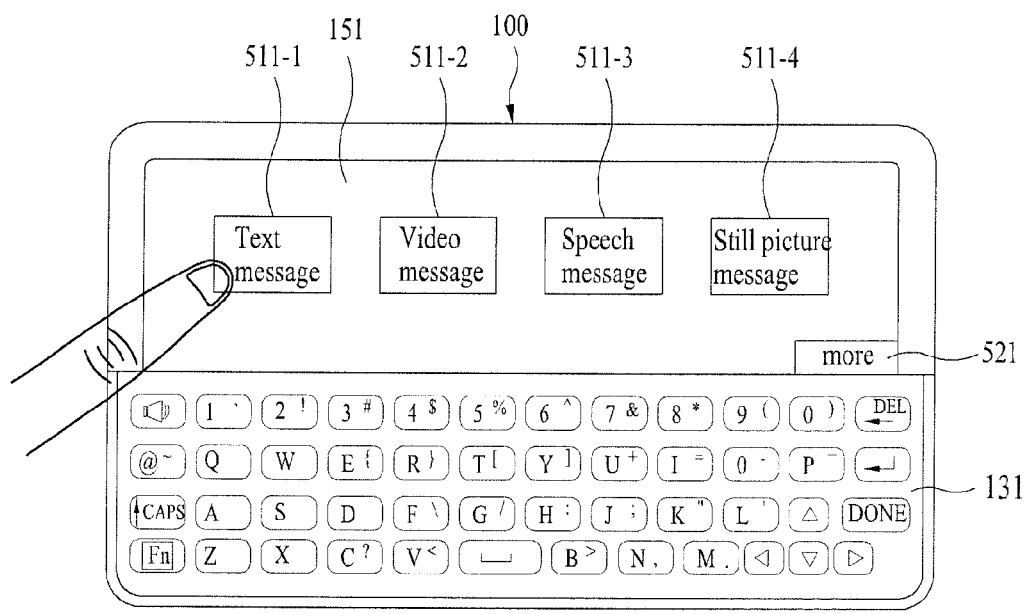
(b)

FIG. 9B
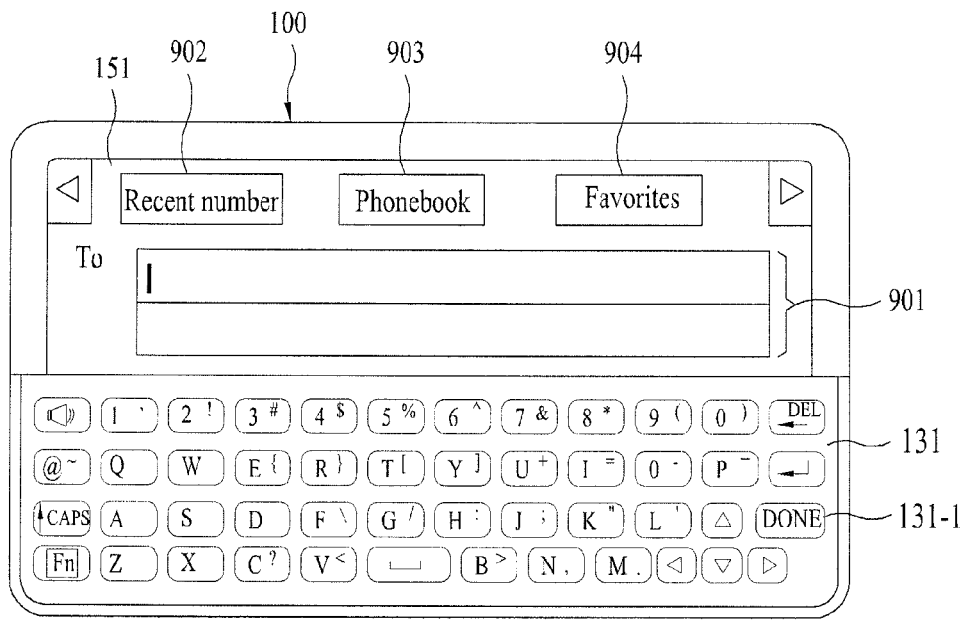
(a)
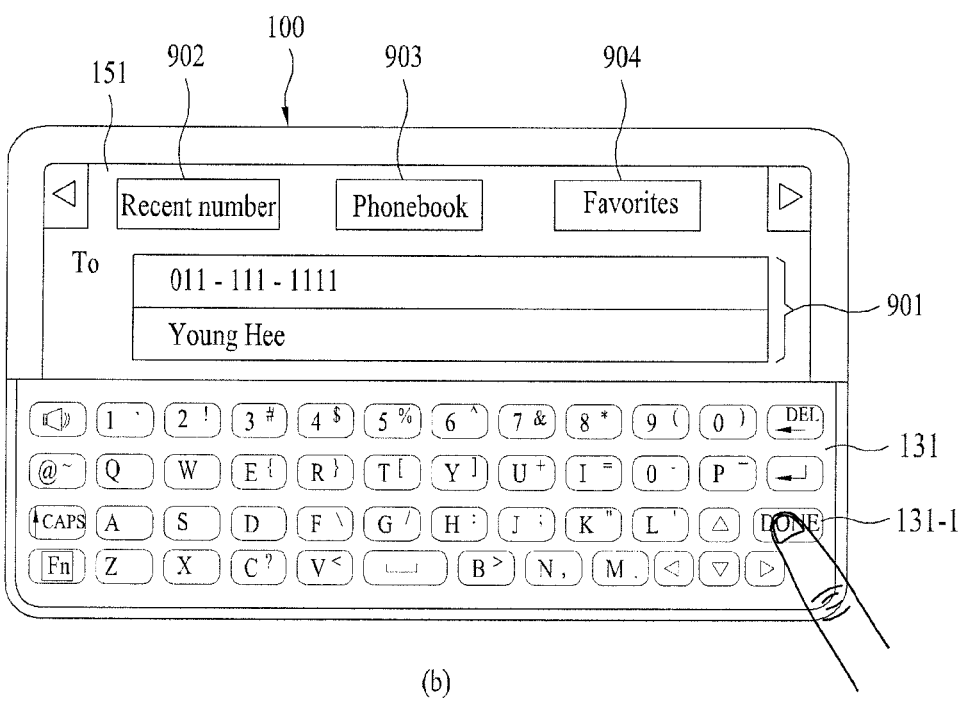
(b)

FIG. 9C
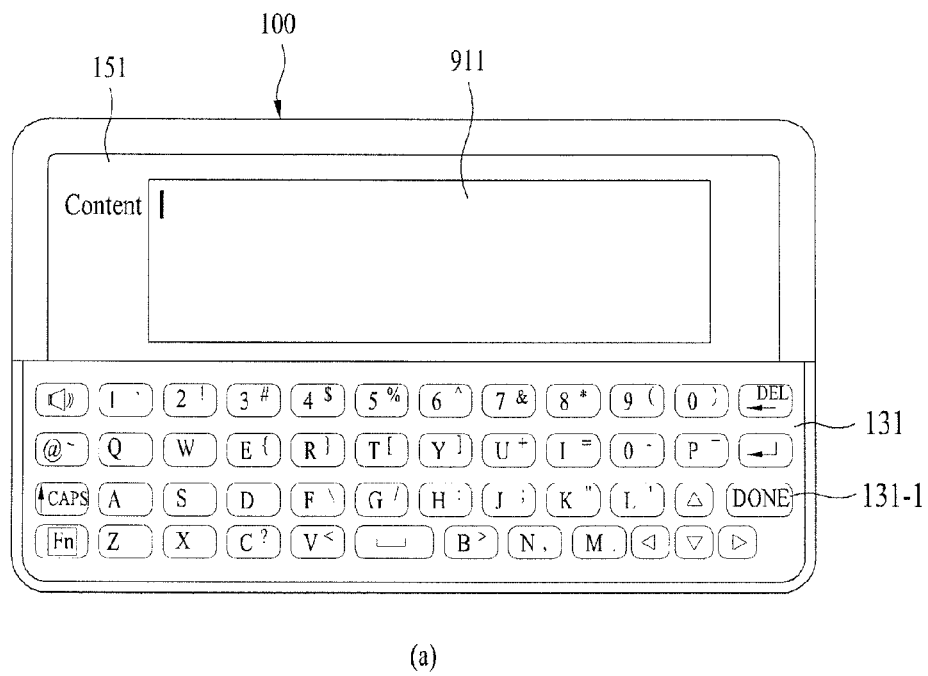
(a)
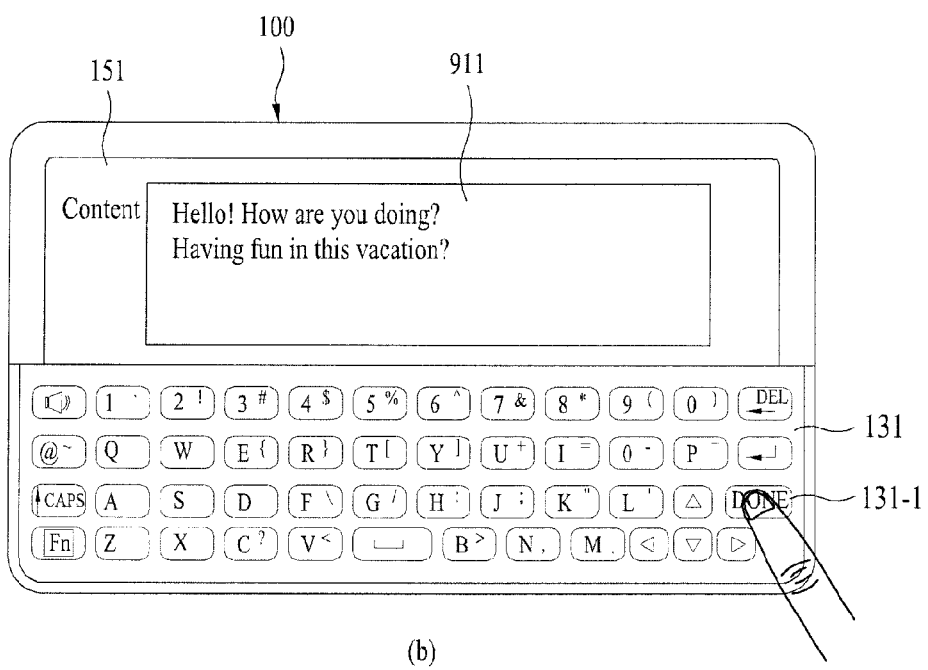
(b)

FIG. 10B
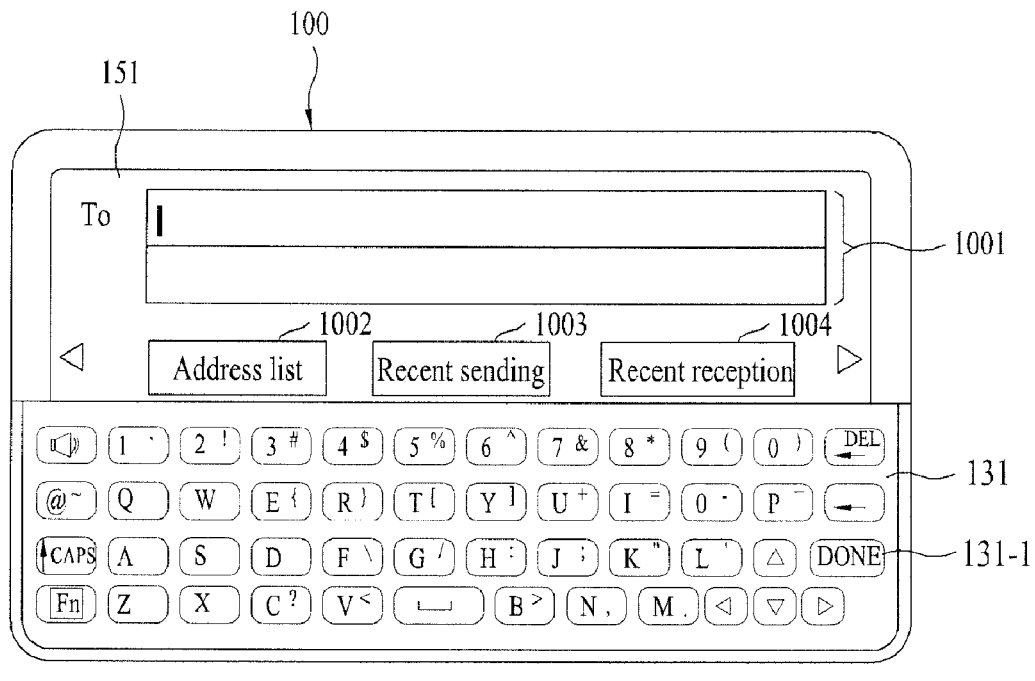
(a)
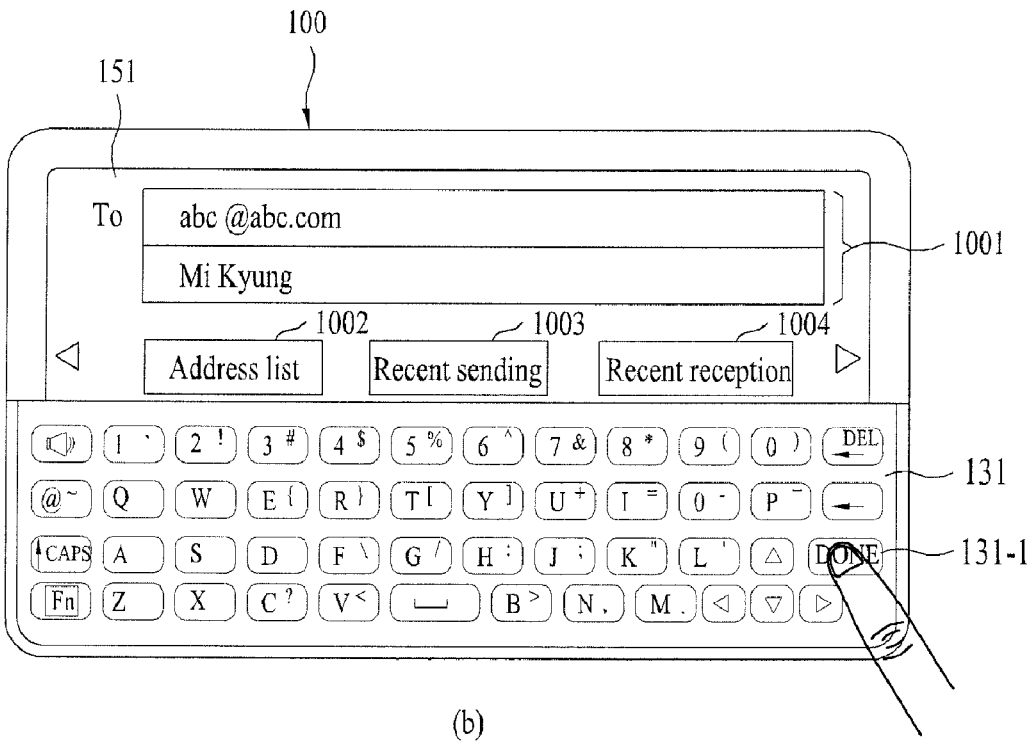
(b)

FIG. 10C
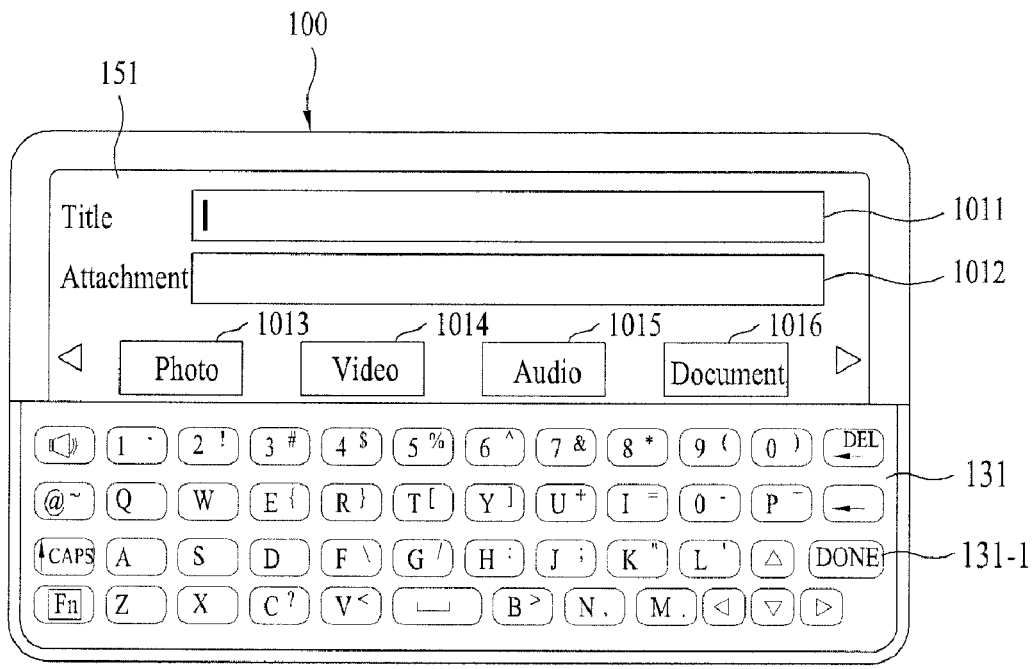
(a)
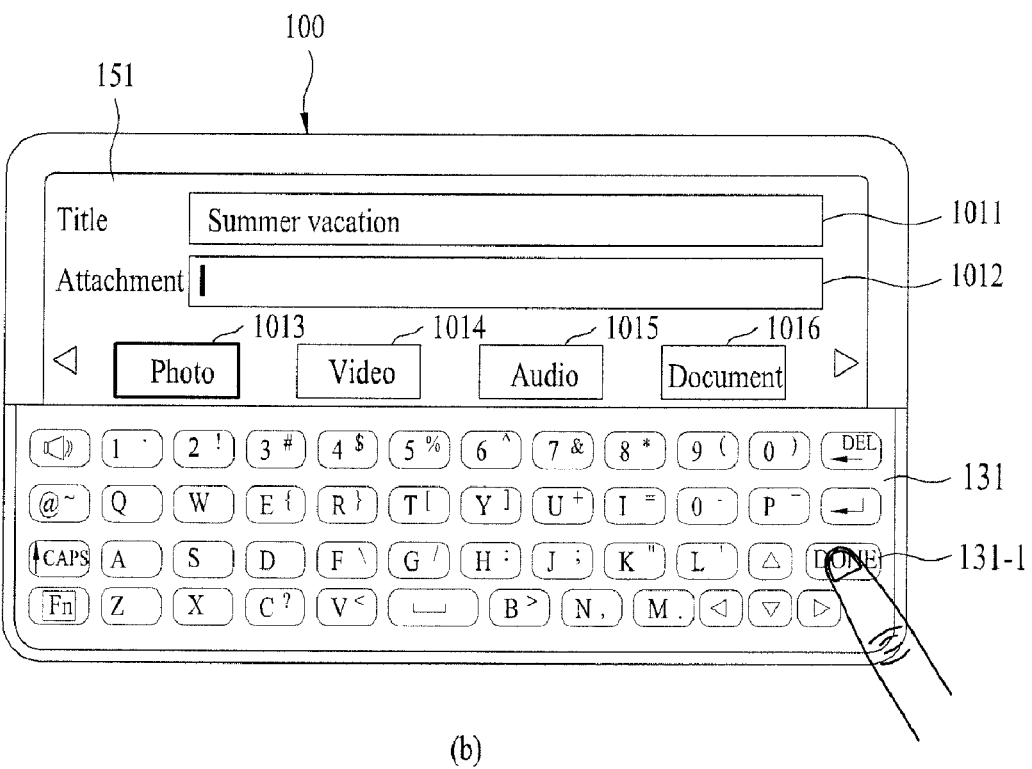
(b)

FIG. 10D
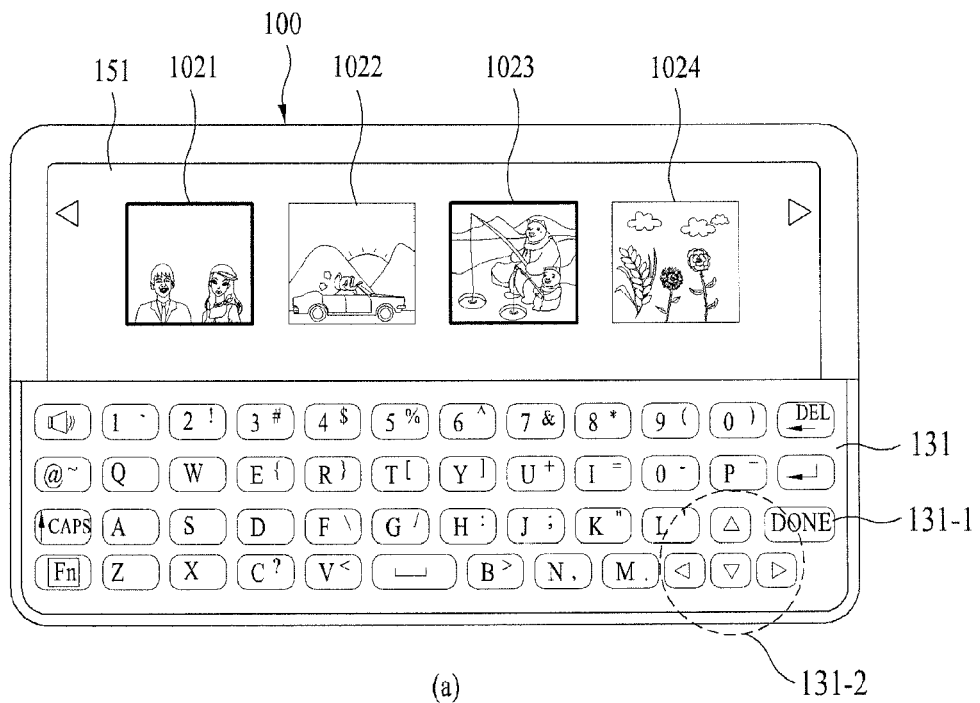
(a)
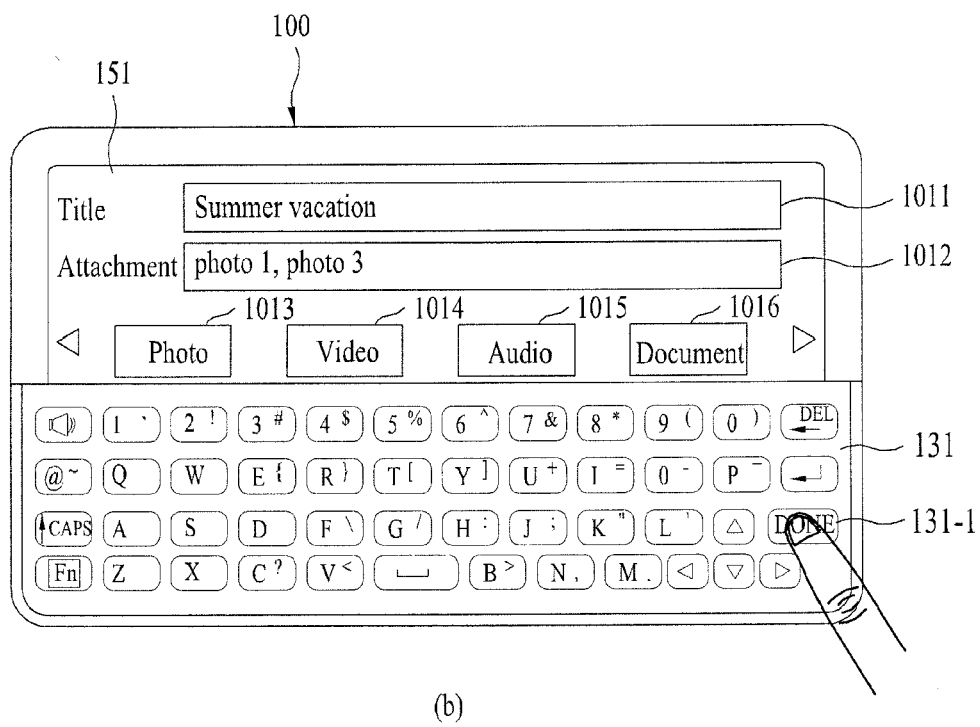
(b)

FIG. 11B
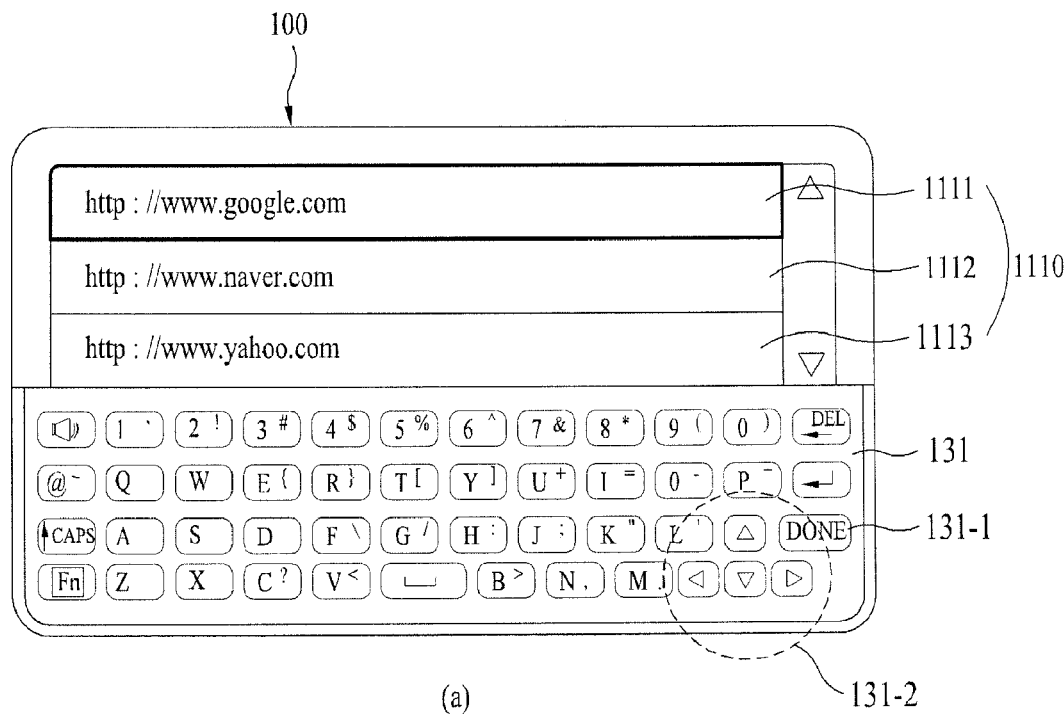
(a)
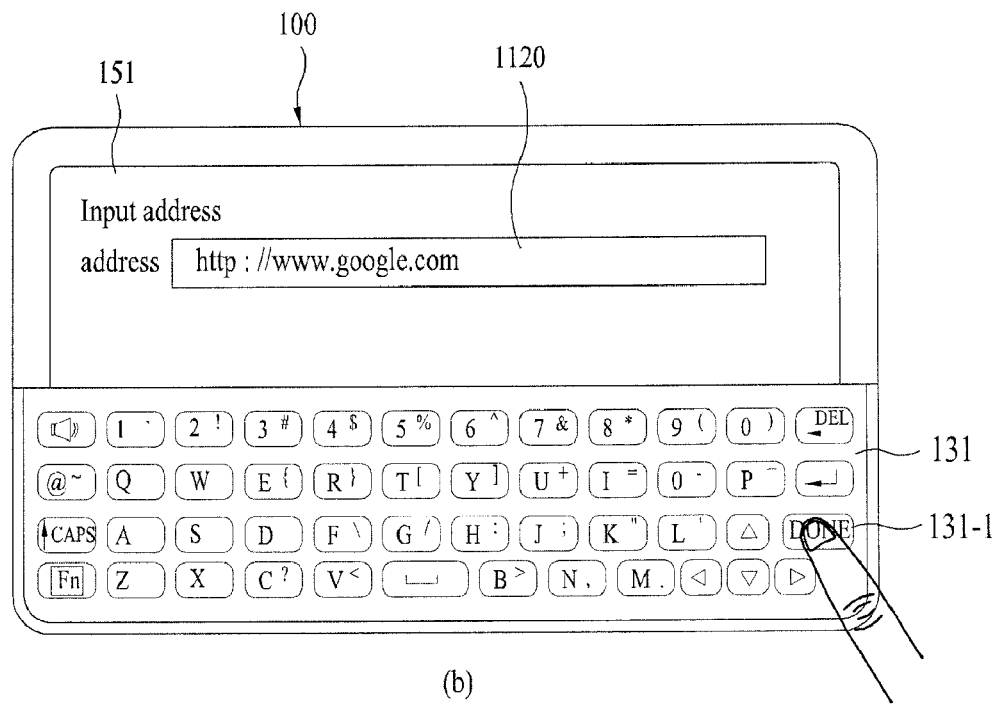
(b)

FIG. 11C
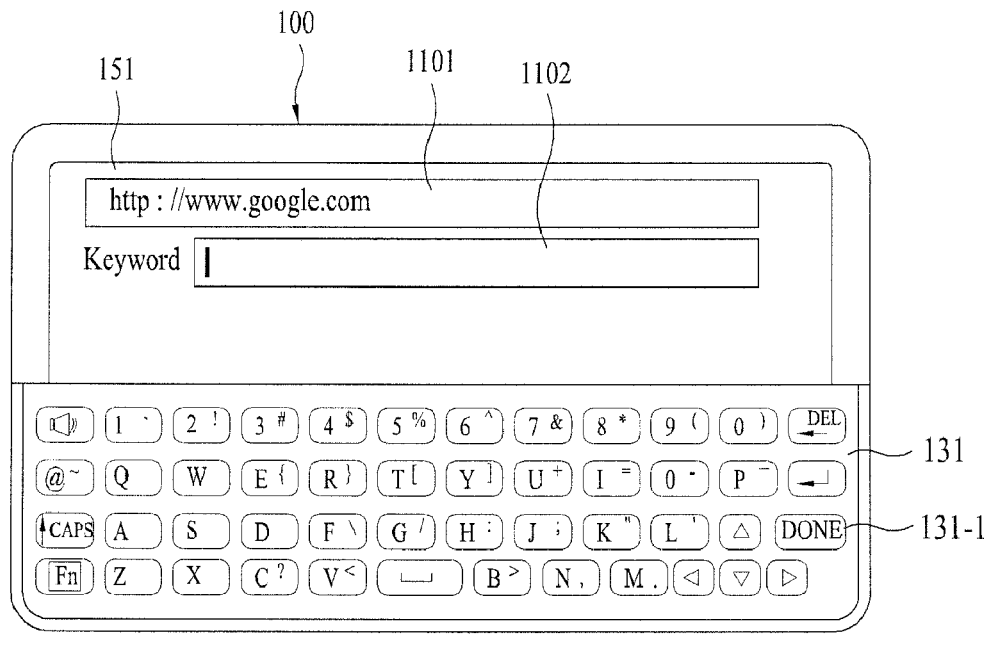
(a)
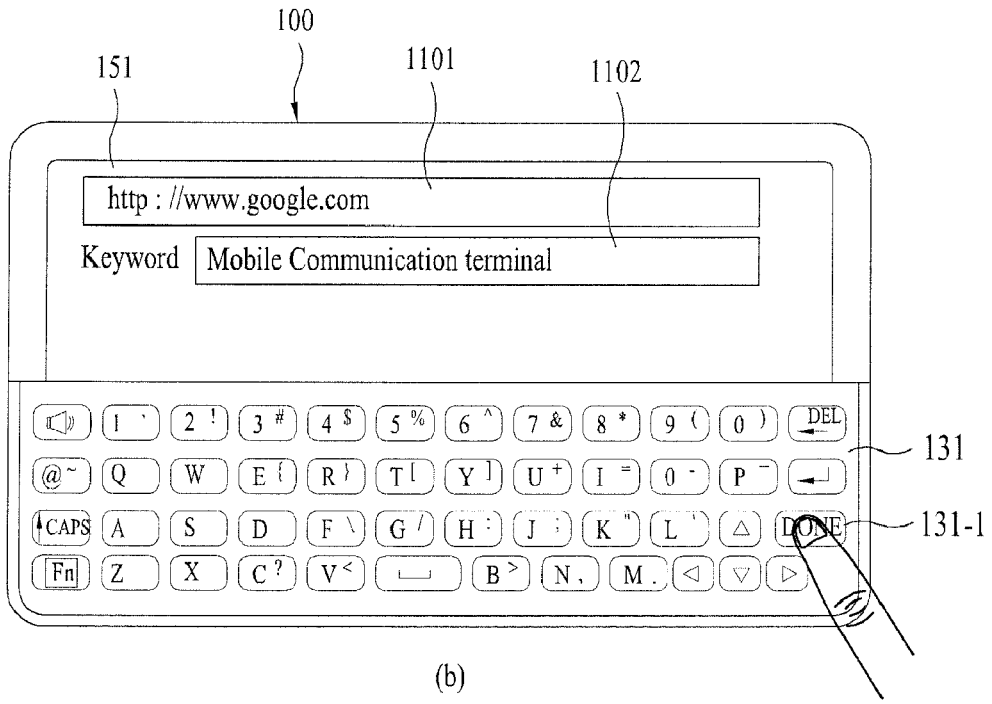
(b)

FIG. 11D
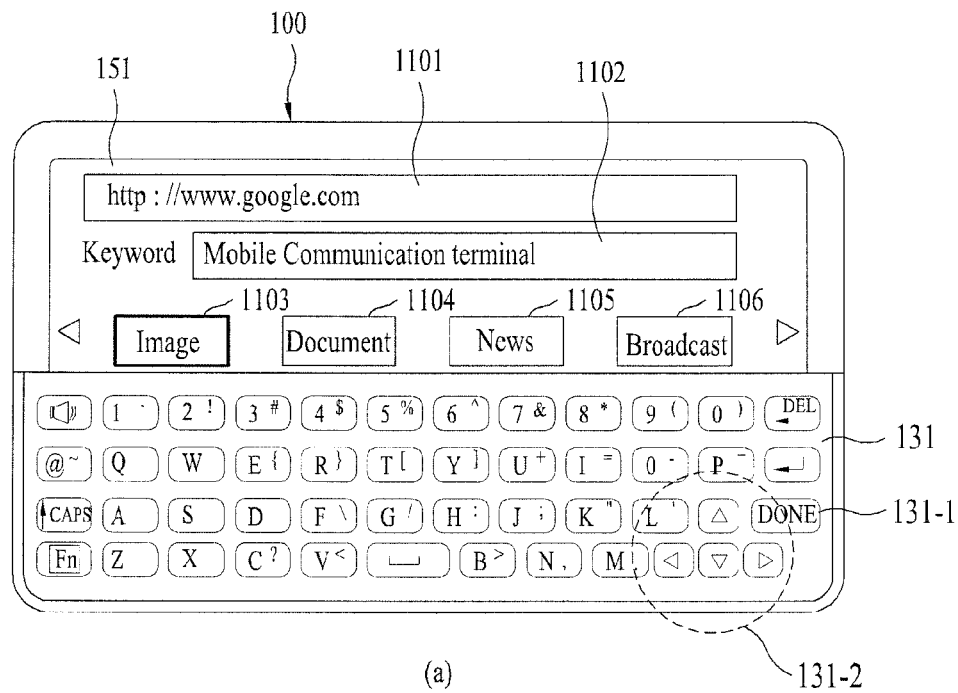
(a)
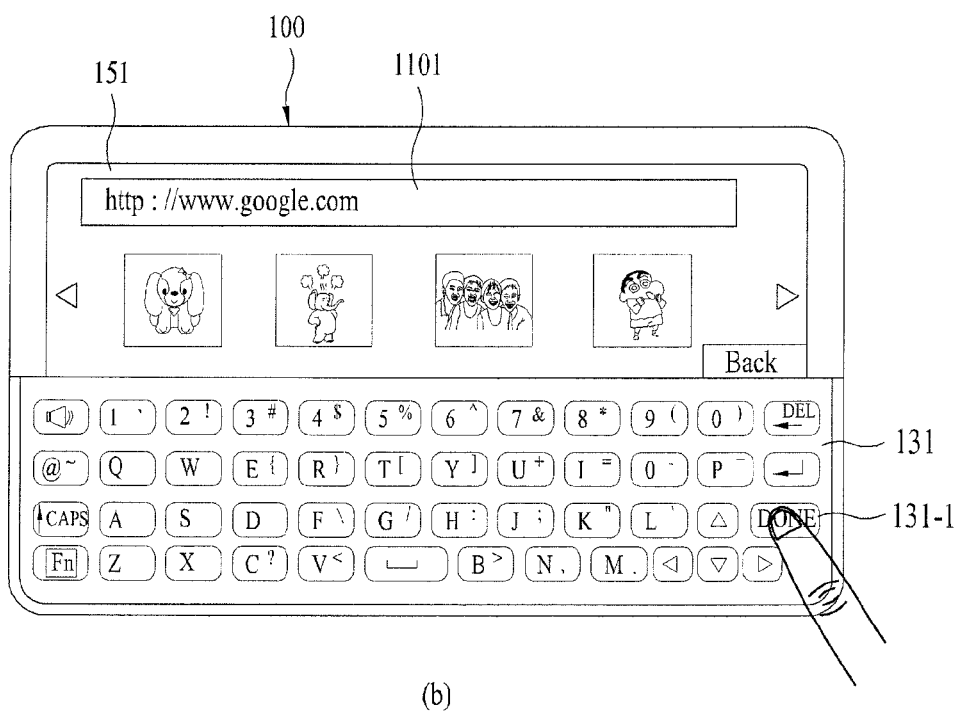
(b)

FIG. 12A
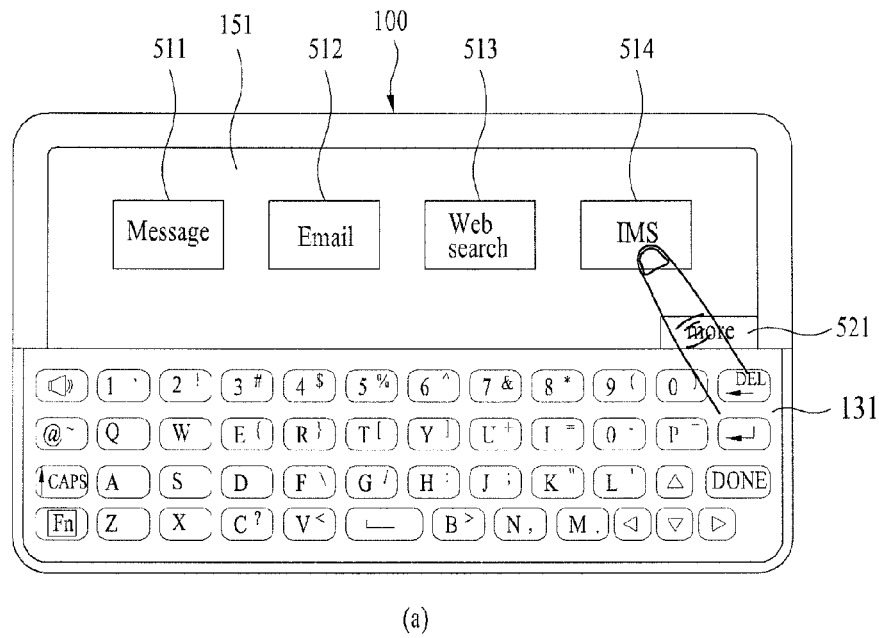
(a)
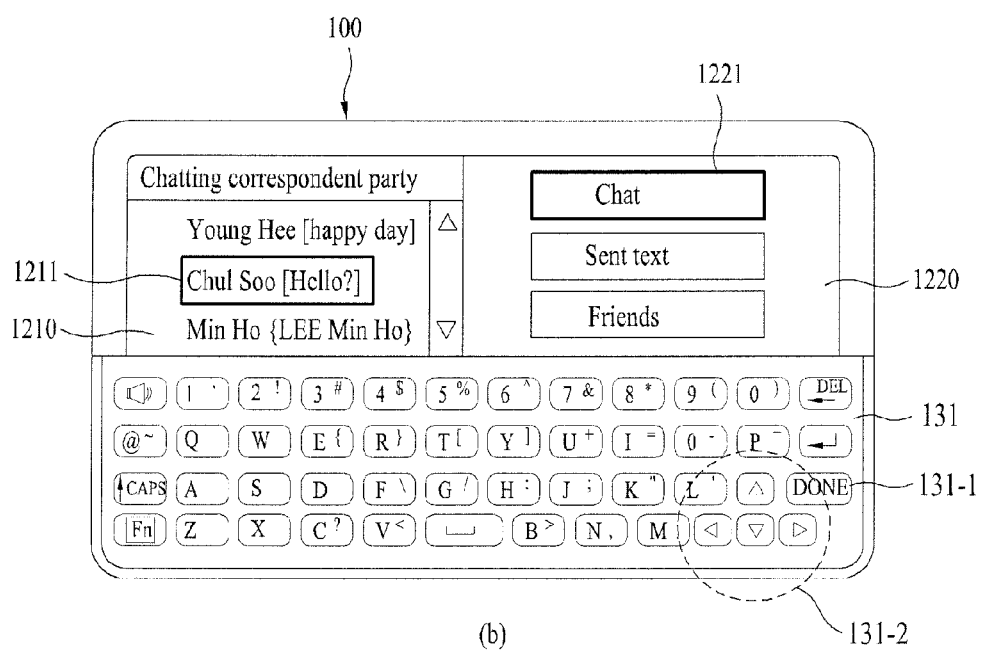
(b)

FIG. 12B
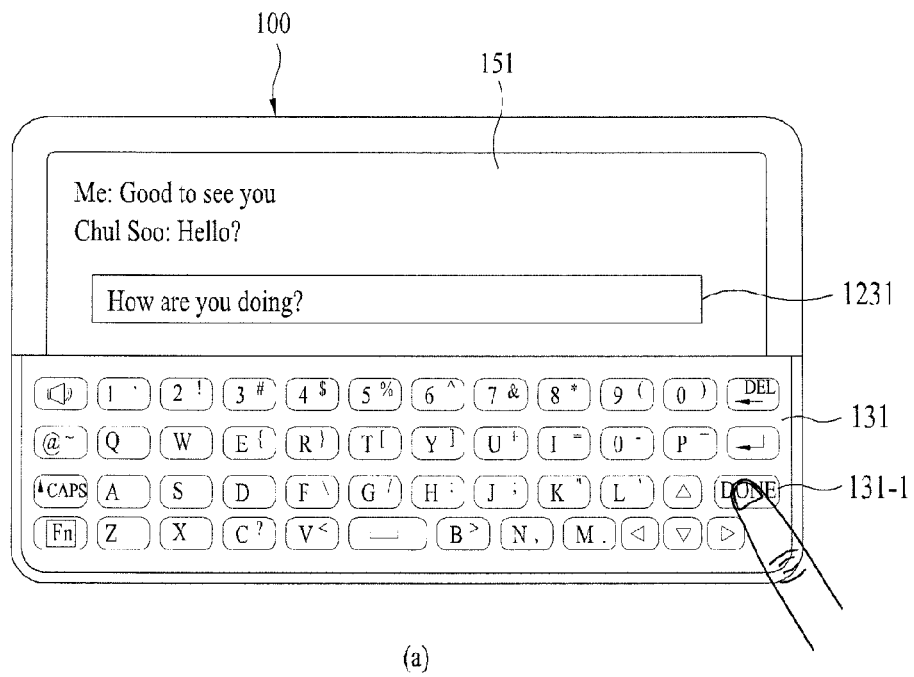
(a)
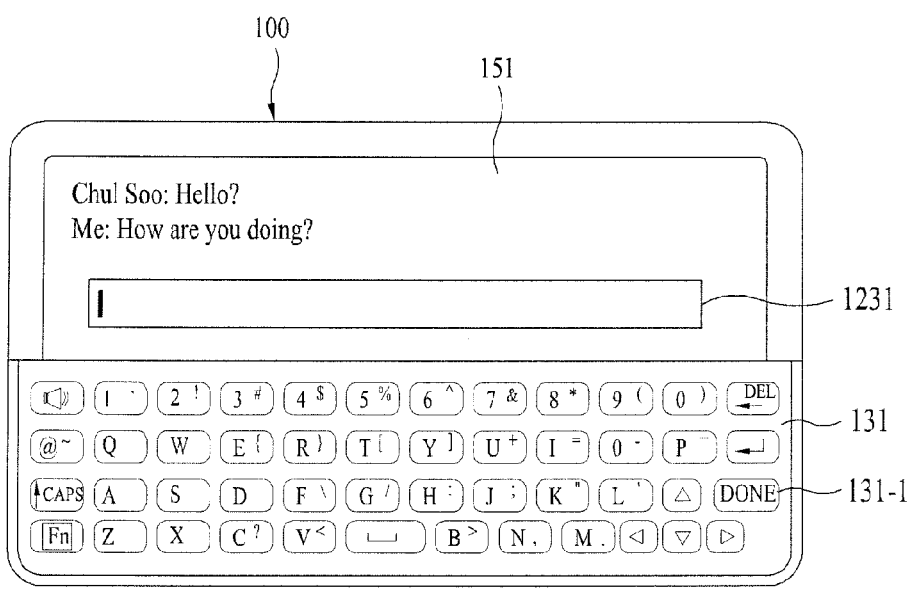
(b)

FIG. 13B
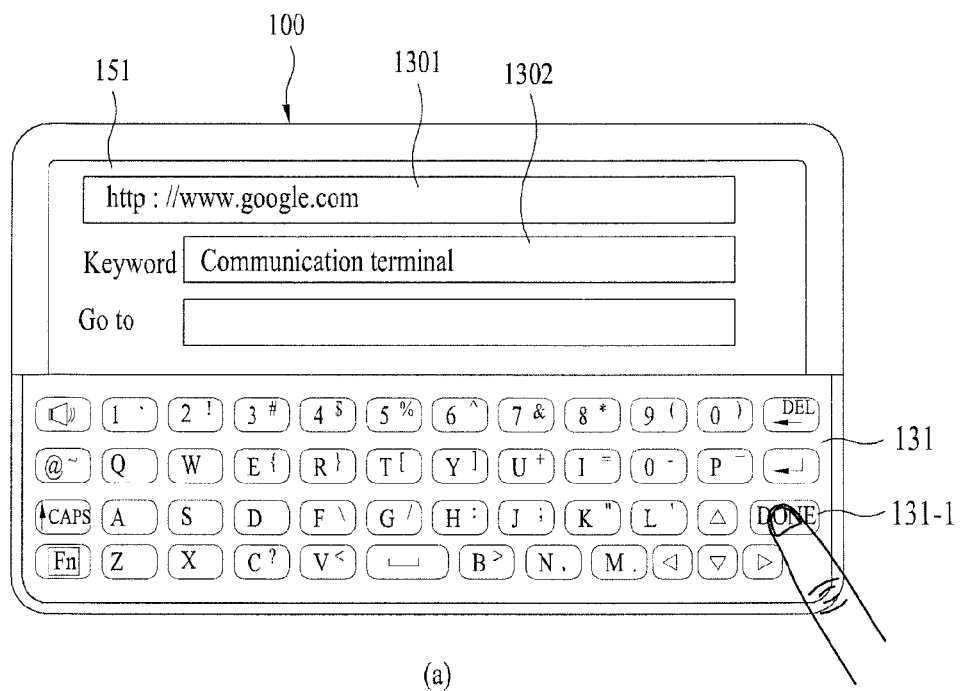
(a)
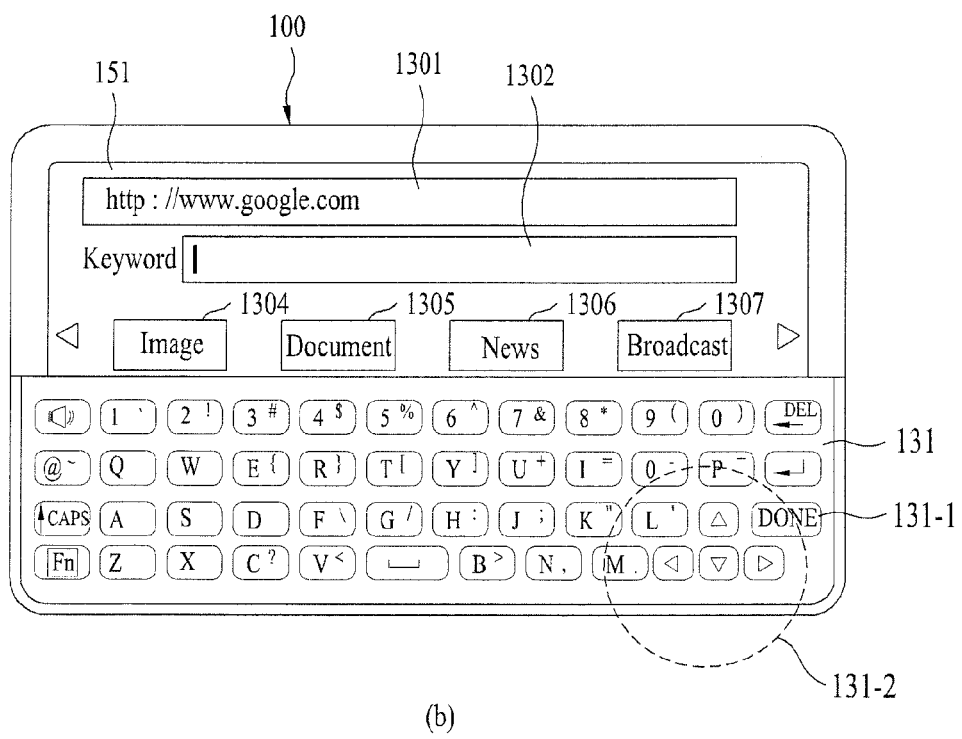
(b)

FIG. 13C
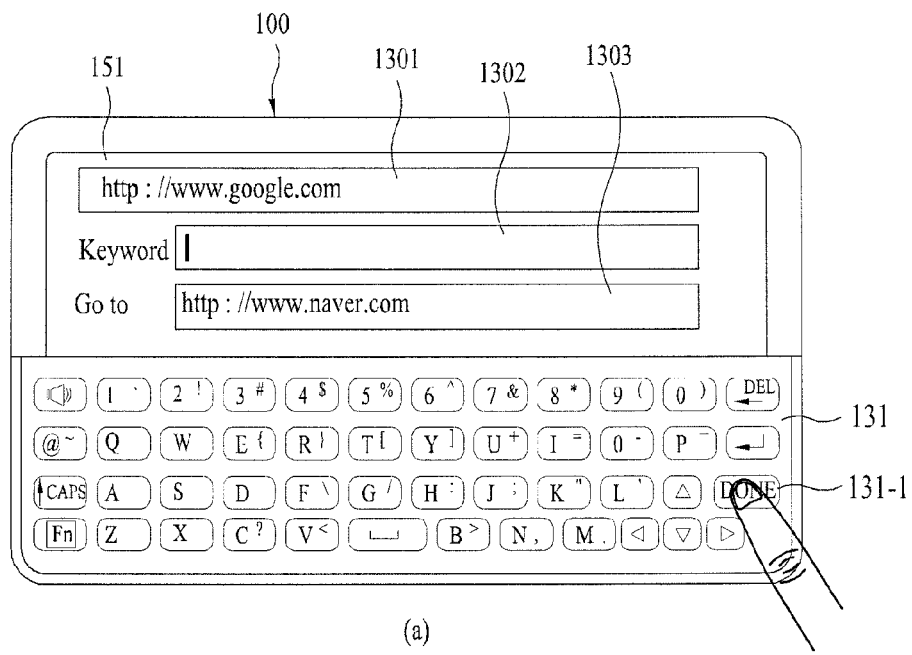
(a)
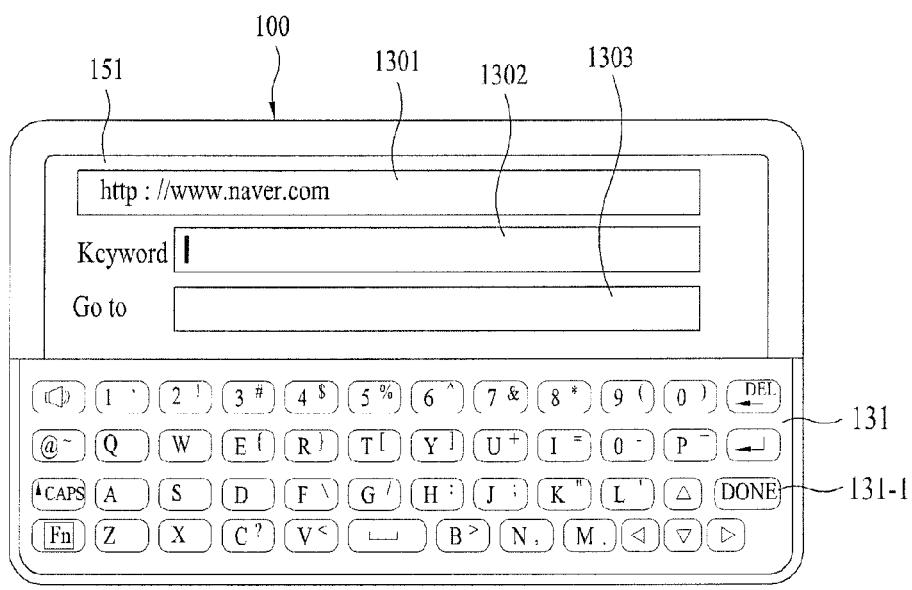
(a)

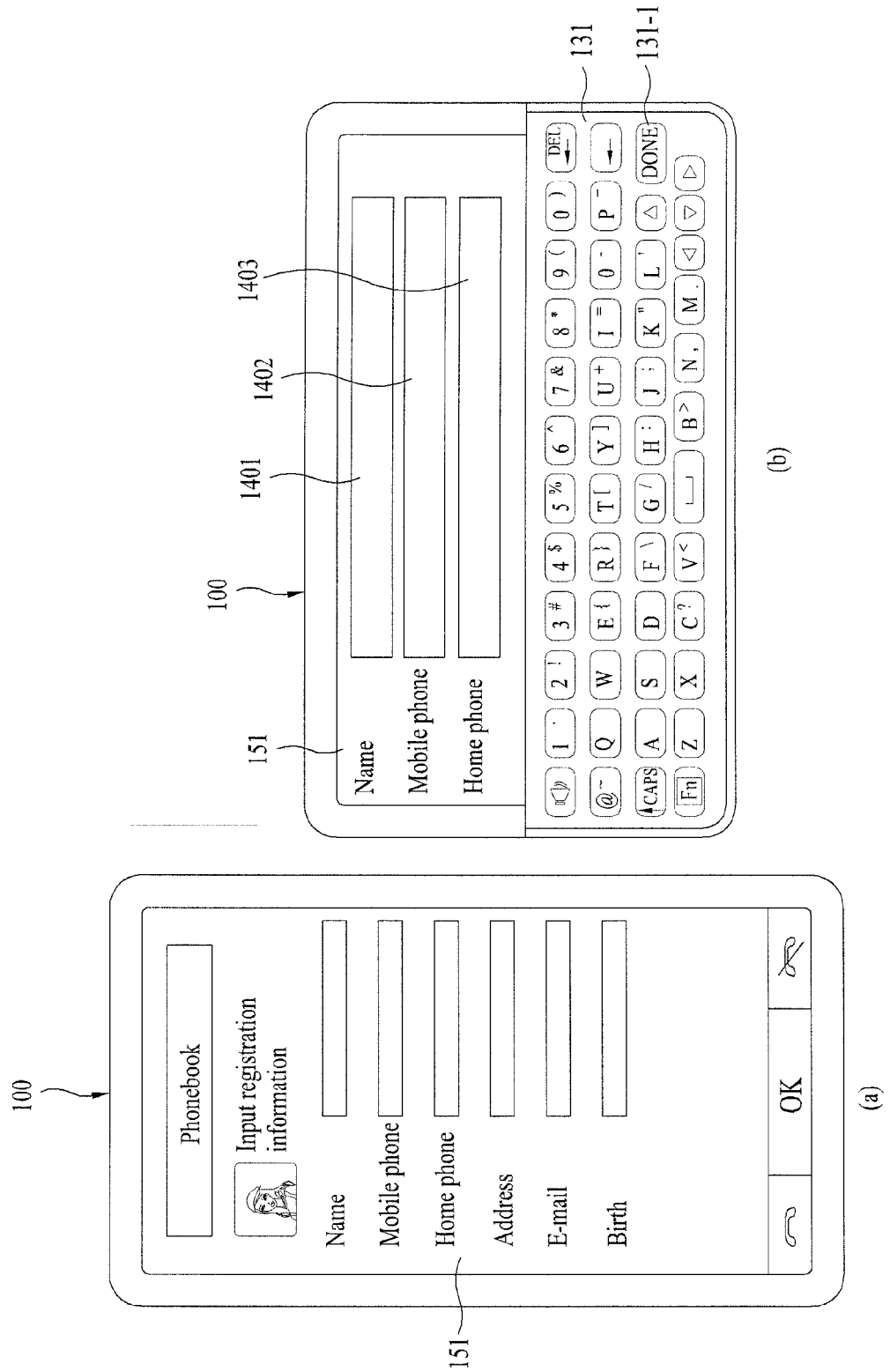

FIG. 14B
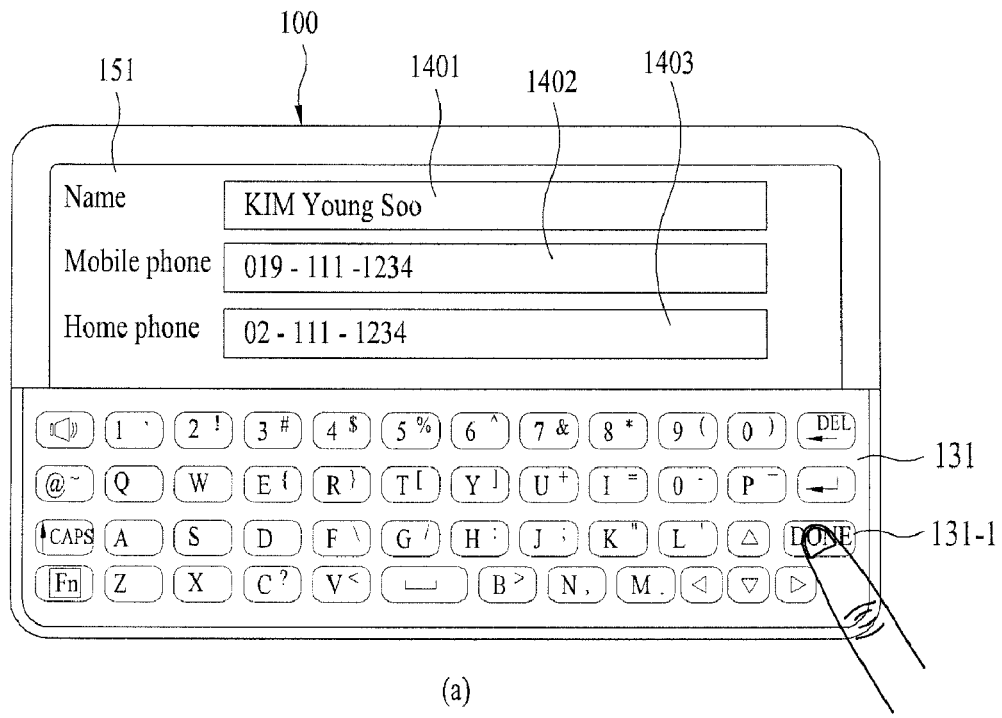
(a)
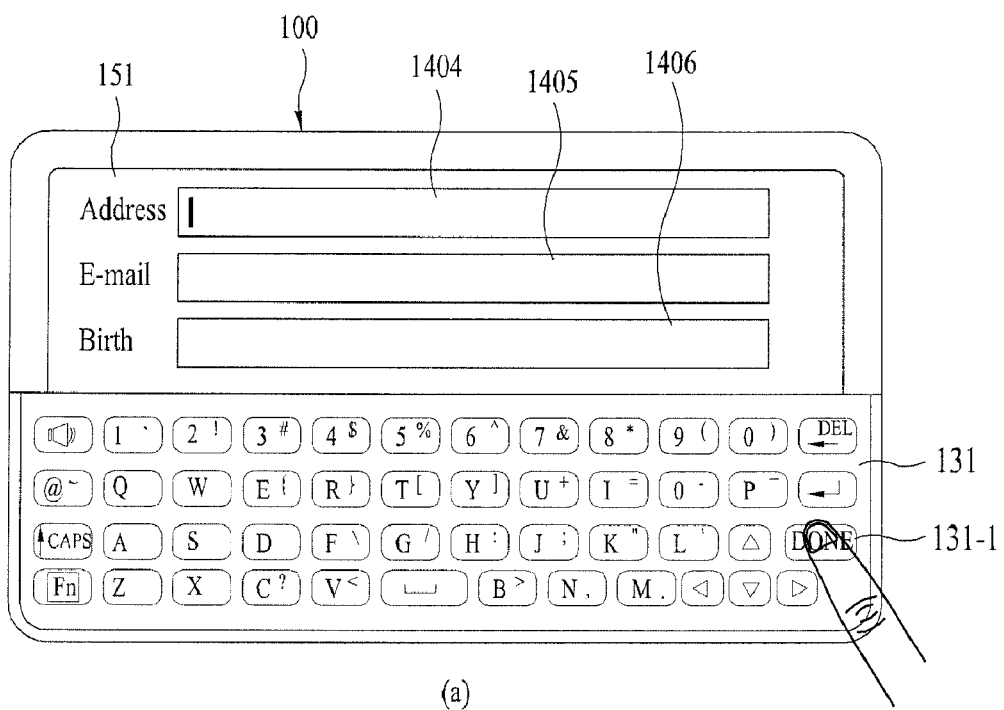
(a)

FIG. 15B
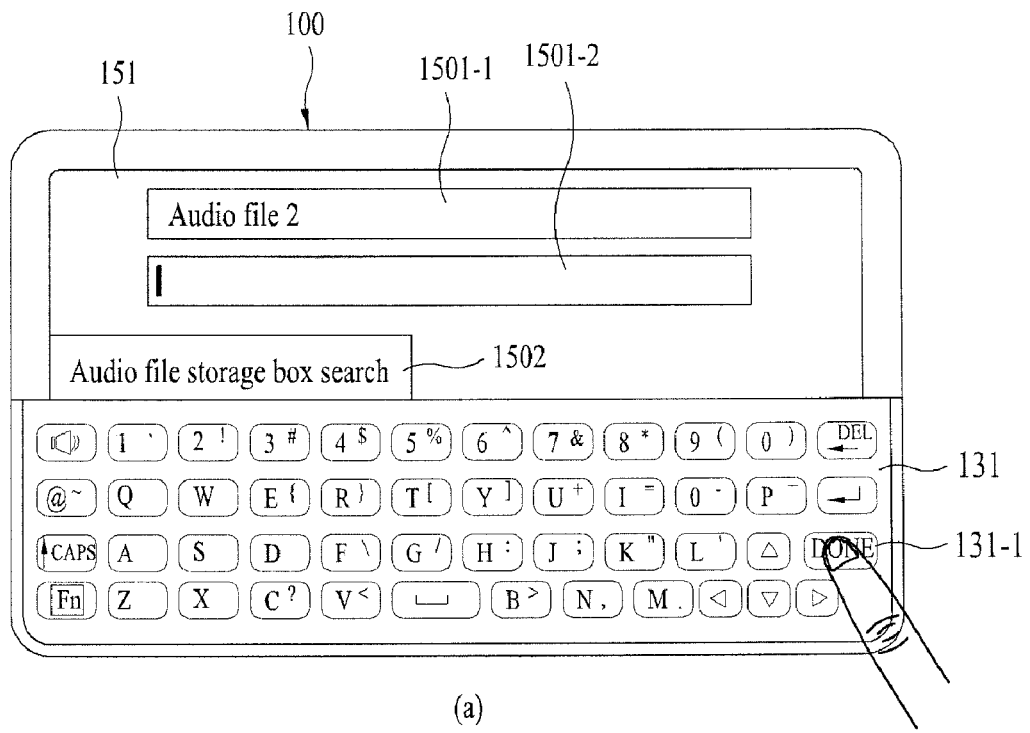
(a)
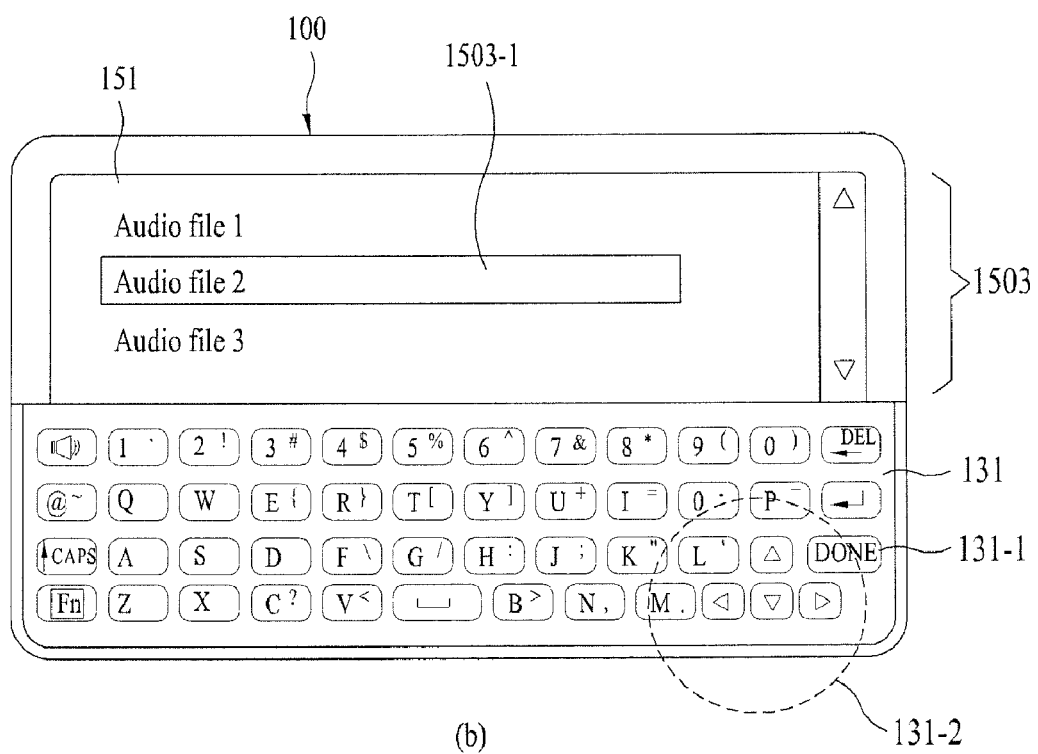
(b)

FIG. 19A
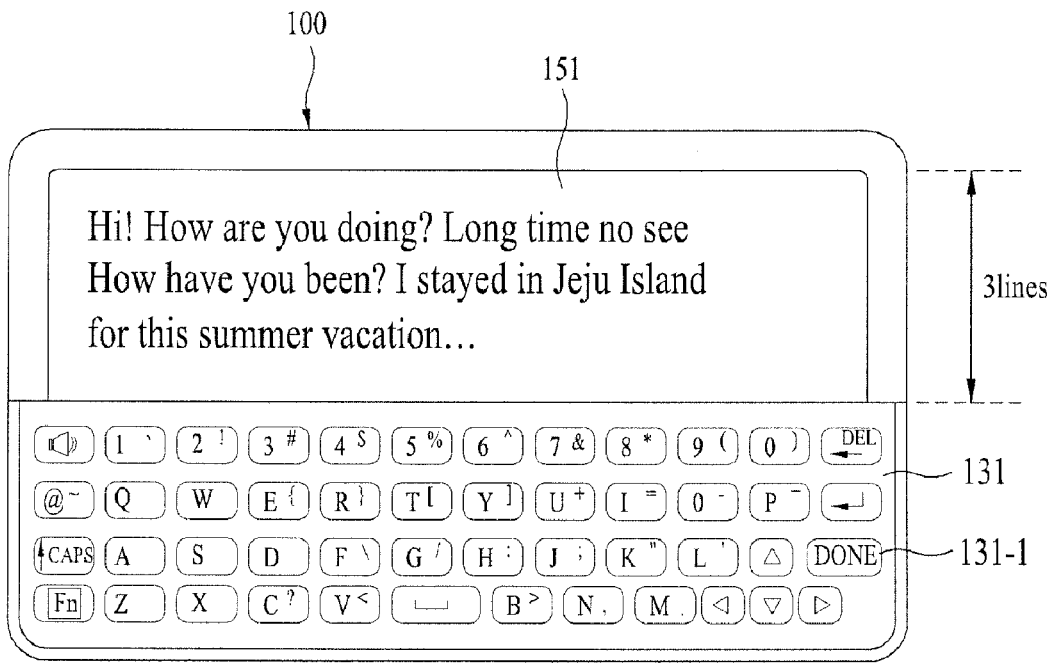
(a)
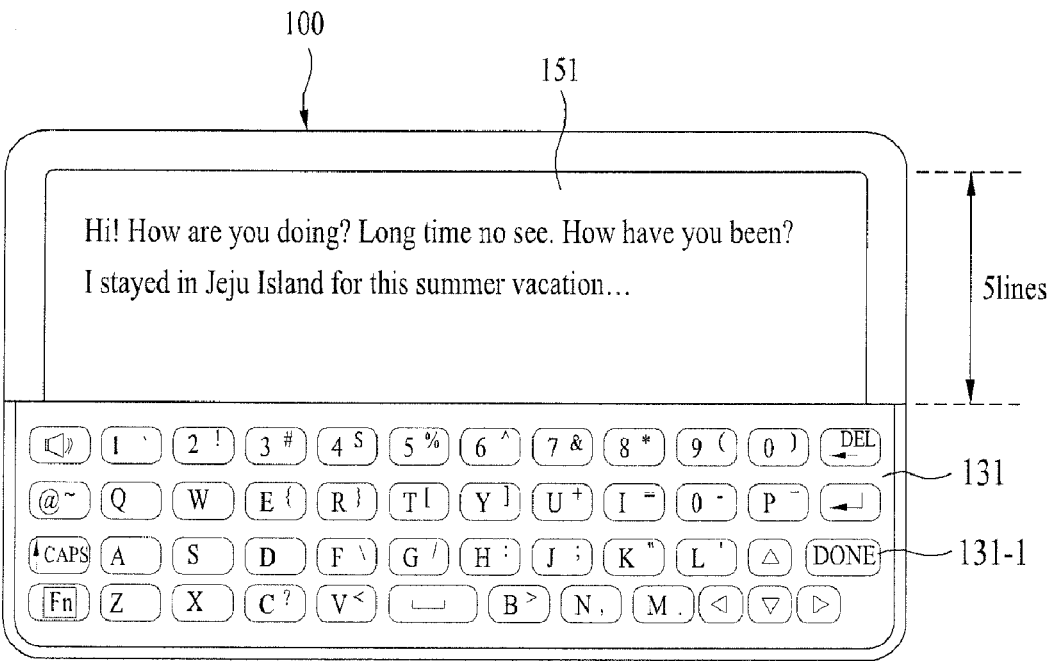
(b)

MOBILE TERMINAL AND DISPLAY CONTROLLING METHOD THEREOF

Pursuant to 35 U.S.C. §119(a), this application claims the benefit of earlier filing date and right of priority to Korean Application No. 10-2009-0079152, filed on Aug. 26, 2009, the contents of which are hereby incorporated by reference herein in their entirety.

BACKGROUND OF THE INVENTION

1. Field of the Invention

The present invention relates to a mobile terminal, and more particularly, to a mobile terminal and display controlling method thereof. Although the present invention is suitable for a wide scope of applications, it is particularly suitable for controlling a display according to a position of a position-movable keypad.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

According to a related art, a mobile terminal is provided with a position movable keypad and a position of the keypad can be freely rearranged according to a user selection.

However, the related art fails in providing a method of displaying a user interface changeably according to the rearrangement of the position of the keypad.

Moreover, if the keypad is located to cover a display region of a display unit in part, the related art fails in providing a detailed method of maintaining a display function in the rest of the display region that is not covered with the keypad.

SUMMARY OF THE INVENTION

Accordingly, the present invention is directed to a mobile terminal and display controlling method thereof that substantially obviate one or more problems due to limitations and disadvantages of the related art.

An object of the present invention is to provide a mobile terminal and display controlling method thereof. Therefore, in case that a keypad is located to cover a display region of a display unit in part, the present invention enables a display function to be effectively performed in the rest of the display region except the partially covered display region.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a keypad provided to have a position changeable, and a control unit, if the position of the keypad is shifted to cover a partial display region of the display unit, changing a normal display mode into a control display mode, the control unit controlling the display unit to perform a display operation corresponding to the control display mode in a different display region except the partial display region.

In another aspect of the present invention, a method of controlling a display in a mobile terminal, which includes a display unit and a keypad provided to have a position changeable, includes the steps of detecting whether the position of the keypad is shifted to cover a partial display region of the display unit, if it is detected that the position of the keypad is shifted, changing a normal display mode into a control display mode, and if the control display mode is entered, performing a display operation corresponding to the control display mode in a different display region except the partial display region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of a mobile terminal according to one embodiment of the present invention;

FIG. 2A and FIG. 2B are front perspective diagrams of a mobile terminal having a position movable keypad according to one embodiment of the present invention;

FIGS. 8A to 8D are diagrams for managing a control display mode via a menu search according to the present invention;

FIGS. 9A to 9D are diagrams of screen configurations for a case that a message is selected from a menu item list displayed in a control display region according to the present invention;

FIGS. 10A to 10F are diagrams of screen configurations for a case that an email is selected from a menu item list displayed in a control display region according to the present invention;

FIGS. 11A to 11E are diagrams of screen configurations for a case that a web search is selected from a menu item list displayed in a control display region according to the present invention;

FIGS. 12A to 12C are diagrams of screen configurations for a case that am IMS is selected from a menu item list displayed in a control display region according to the present invention;

FIGS. 13A to 13C are diagrams of screen configurations for a case that a keypad is positioned to cover a partial display region in a web search application driven mode according to the present invention;

FIGS. 14A to 14C are diagrams of screen configurations for a case that a keypad is positioned to cover a partial display region in a phonebook registration application driven mode according to the present invention;

FIGS. 15A to 15C are diagrams of screen configurations for a case that a keypad is positioned to cover a partial display region in an MP3 play application driven mode according to the present invention;

FIG. 19A and FIG. 19B are diagrams of screen configurations for adjusting a data display size according to a data size displayed in a control display region according to the present invention.

DETAILED DESCRIPTION OF THE INVENTION

Figure 2B:
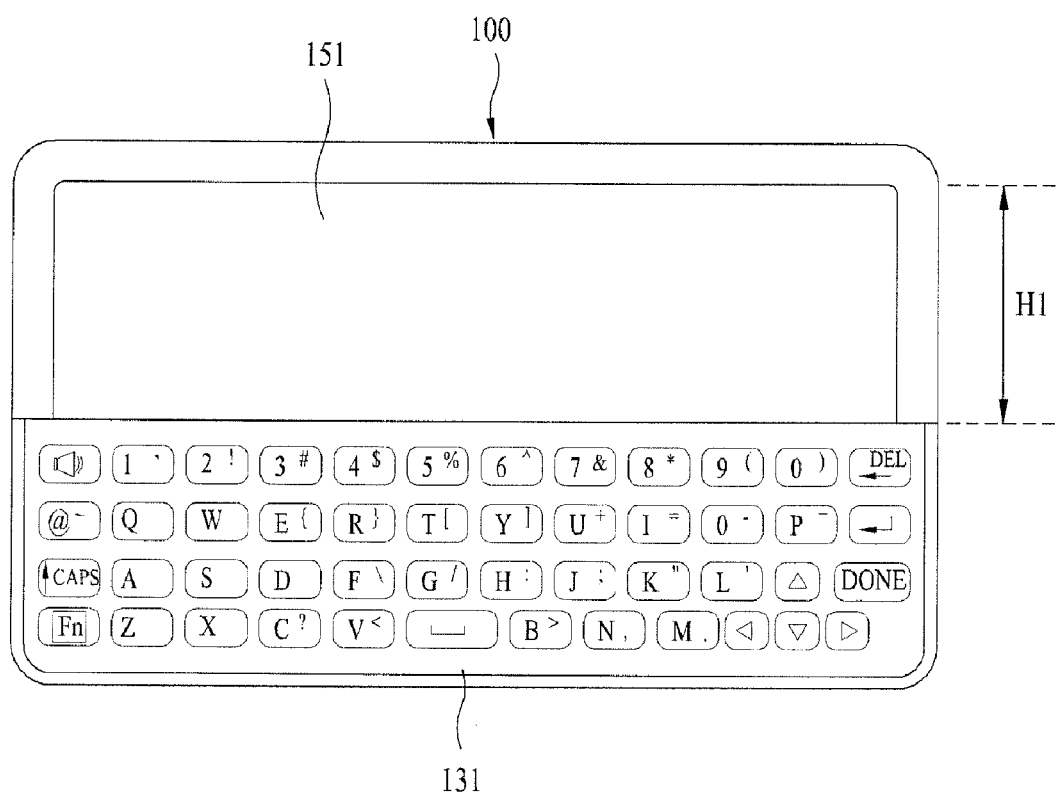

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the following description, assume that a mobile terminal can include at least one of the elements shown in FIG. 1.

In the following description, a mobile terminal having a keypad located position-changeably according to one embodiment of the present invention is explained in detail with reference to the accompanying drawings.

FIG. 2A and FIG. 2B are front perspective diagrams of a mobile terminal having a position movable keypad according to one embodiment of the present invention.

Referring to FIG. 2A, a keypad 131 is movably provided to a backside of the mobile terminal 100 [*a*] and can move left and right by sliding [*b*].

Referring to FIG. 2B, the keypad 131 is moved to expose its whole front side externally in FIG. 2A (b) and is then shifted to be located above a front side of the display unit 151.

In particular, the position shift of the keypad 131 can be performed in a following manner. First of all, the keypad 131 slides to move in a lateral direction from a backside of the mobile terminal 100. Secondly, the keypad 131 is then shifted over the display unit 151.

Thus, the keypad 131 may be arranged to cover a partial region of a whole display region of the display unit 151. In this case, the display unit 151 is able to perform a display operation in a display region (hereinafter named a control display region) except the partial display region covered with the keypad 131.

Moreover, if a keypad having a key arrangement direction vertical to a display direction of the display unit 151 is position-shifted to cover a partial display region, the mobile terminal 100 is able to change a display direction of the display unit 151 into the same direction of the key arrangement direction.

For instance, if a keypad having a key arrangement direction set to a horizontal direction in a vertical view mode (i.e., display direction: vertical direction) is positioned to cover a partial display region, the mobile terminal 100 is able to set a vertical view mode (i.e., display direction: horizontal direction).

Of course, the keypad 131 can be provided to any portion of the mobile terminal 100. A position of the keypad 131 is changeable in various ways. In particular, the keypad 131 is positioned over a front side of the display unit 151 to cover the partial display region.

In the following description, a state of adjusting a control display region according to a position shift of a keypad according to one embodiment of the present invention is explained in detail with reference to the accompanying drawings.

Figure 3A:
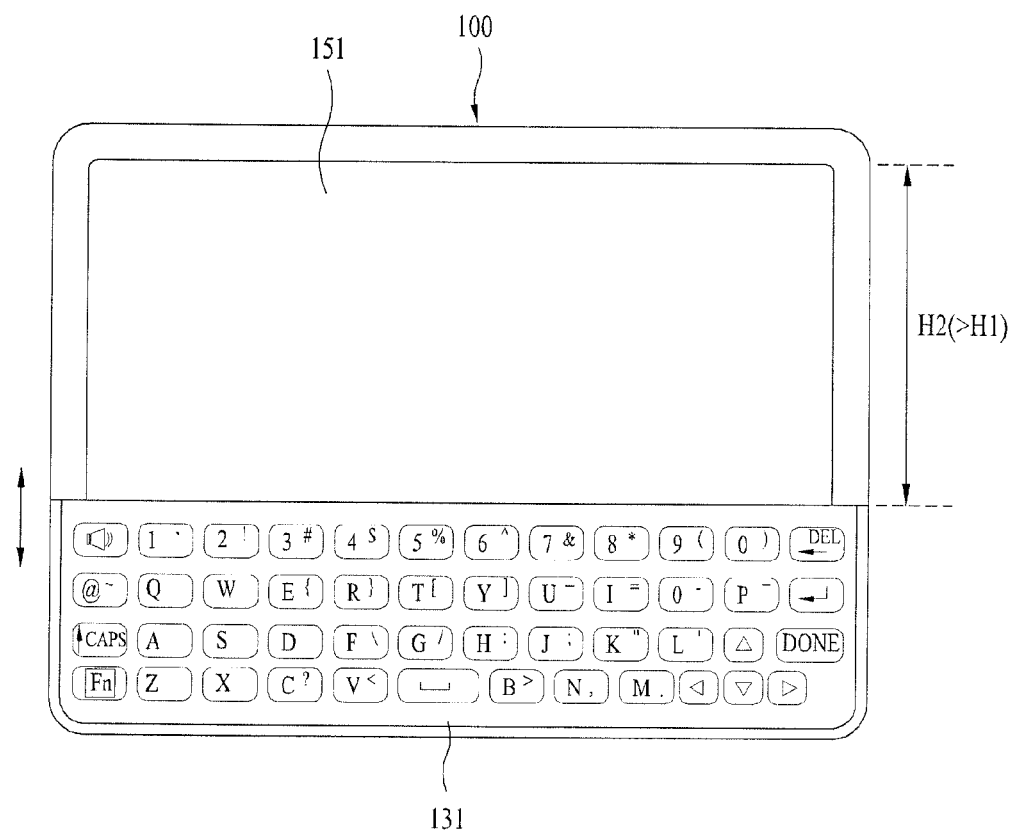
FIG. 3A and FIG. 3B are front diagrams of a mobile terminal according to one embodiment of the present invention, in which a control display region is adjusted according to a position shift of a keypad.
Figure 3B:
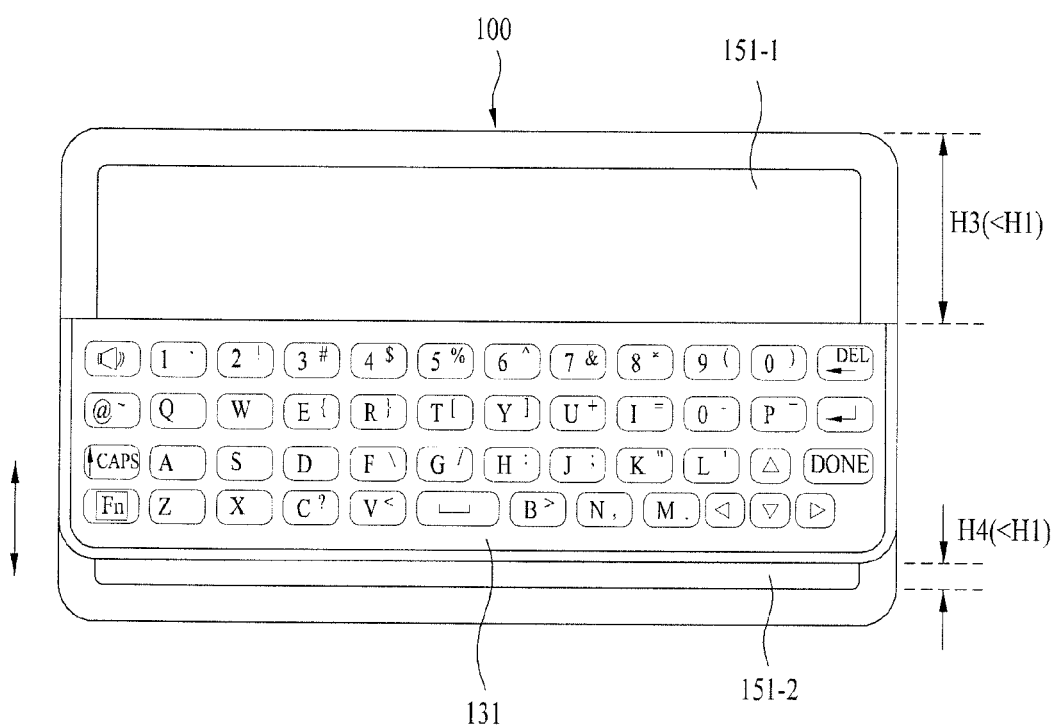

FIG. 3A and FIG. 3B are front diagrams of a mobile terminal according to one embodiment of the present invention, in which a control display region is adjusted according to a position shift of a keypad.

Referring to FIG. 3A, while a first control display region having a vertical length set to H1 is secured, if the keypad 131 is moved in a bottom direction, a control display region can be set to a second control display region having a vertical length set to H2 (>H1). Therefore, a user is able to adjust a size of the control display region by shifting a position of the keypad 131.

Referring to FIG. 3B, while a first control display region having a vertical length set to H1 is secured, if the keypad 131 is moved in a top direction, a control display region can be set to a third control display region (vertical length set to H3) located in a direction of the keypad 131 and a fourth control display region (vertical length set to H4) located in a bottom direction of the keypad 131. Therefore, a user is able to set a plurality of control display regions by shifting a position of the keypad 131.

Figure 4:
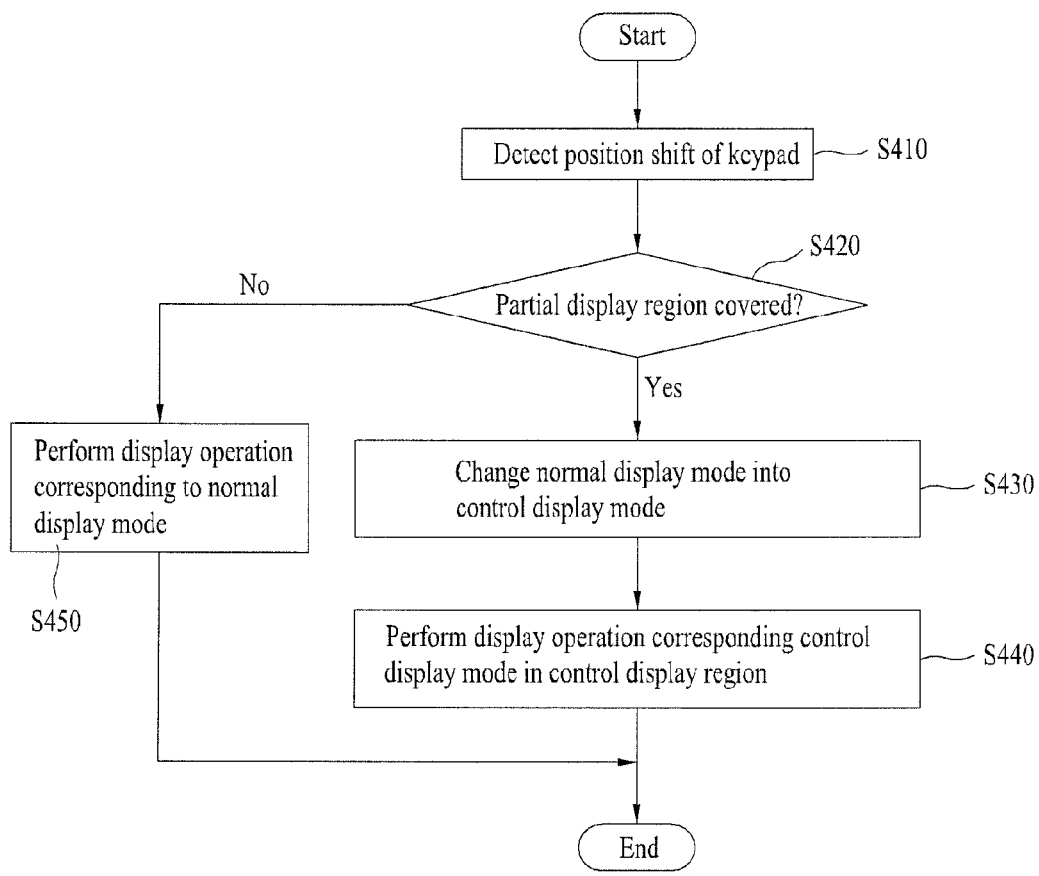
FIG. 4 is a flowchart of a display controlling method of a mobile terminal according to one embodiment of the present invention.

In the following description, a display controlling method of a mobile terminal according to one embodiment of the present invention is explained in detail with reference to FIG. 4. FIG. 4 is a flowchart of a display controlling method of a mobile terminal according to one embodiment of the present invention.

Referring to FIG. 4, the mobile terminal 100 detects whether a position of the keypad 131 is shifted under the control of the controller 180 [S410].

In this case, the keypad 131 is provided to be position-movable for the mobile terminal 100 [cf. FIG. 2A].

As a result of the detected position shift of the keypad 131 in the detecting step 410, the mobile terminal 100 determines whether the keypad 131 is positioned to cover a partial display region of a whole display region of the display unit 151 [S420].

In this case, the keypad 131 can be position-shifted to cover the partial display region of the display unit 151 [cf. FIG. 2A, FIG. 3A, FIG. 3B].

In case of determining that the keypad 131 is shifted to cover the partial display region in the determining step S420, the mobile terminal 100 sets a display mode to be set to a control display mode from a normal display mode under the control of the controller 180 [S430].

In this case, the display mode may mean a display scheme by the display unit 151. The normal display mode may mean a display scheme when the partial display region of the display unit 151 is not covered with the keypad 131. And, the control display mode may mean a display scheme when the partial display region of the display unit 151 is covered with the keypad 131.

For instance, if a display mode is set to be changed into a control display mode in a vertical view state, the mobile terminal 100 changes the display mode into a horizontal view state under the control of the controller 180. If a display mode is set to be changed into a control display mode in a horizontal view state, the mobile terminal 100 is able to maintain the horizontal view state under the control of the controller 180. In this case, assume that a display direction of the display unit 151 is vertical to a key arrangement direction of the keypad prior to the setting of changing into the control display mode.

Subsequently, under the control of the controller 180, the mobile terminal 100 performs a display operation corresponding to the control display mode in a display region (hereinafter named a control display region) except the partial display region covered with the keypad 131 in the whole display region of the display unit 151 [S440].

For instance, in the performing step S440, if a position of the keypad 131 is shifted to cover the partial display region in one of an inactive display unit state, a background image display state and a menu item display state, the mobile terminal 100 is able to display a menu item list constructed with at least one menu item pre-designated to be provided in the control display mode.

In the performing step S440, if a position of the keypad 131 is shifted to cover the partial display region in a specific application driven state, the mobile terminal 100 is able to display a text input window related to the specific application.

In the following description, the performing step S440 is explained in detail with reference to the accompanying drawings.

Meanwhile, in case of determining that the keypad 131 is not shifted to cover the partial display region in the determining step S420, the mobile terminal 100 performs a display operation corresponding to the normal display mode under the control of the controller 180 [S450].

In the following description, a state of performing a display operation corresponding to a control display mode is explained in detail with reference to the accompanying drawings.

For clarity and convenience of the following description, assume that an application non-driven state and an application driven state exist.

In this case, an application may mean a functional program drivable by the mobile terminal 100. For instance, this application can include a message application, an email application, a web search application, an IMS application, a broadcast application or the like. In particular, the message application can include a message writing application, a received message related application, an outgoing message related application and the like.

The application non-driven state means a state that any application is not driven. And, the application driven state may mean a state that at least one application is driven.

First of all, a display operation corresponding to a control display mode in an application non-driven state is explained as follows.

FIGS. 5A to 5D are diagrams of screen configurations for displaying a menu item list corresponding to a control display mode if a keypad is positioned to cover a display region in part in an application non-driven mode according to the present invention.

Figure 5A:
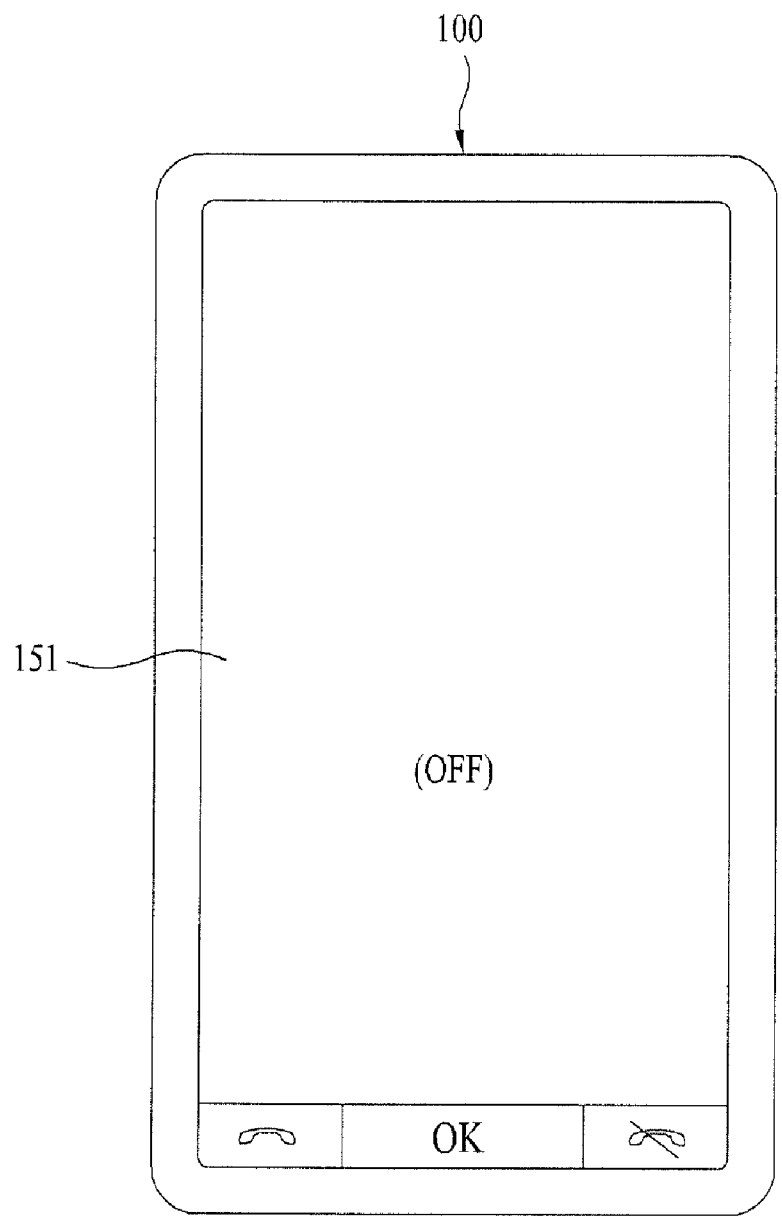
FIGS. 5A to 5D are diagrams of screen configurations for displaying a menu item list corresponding to a control display mode if a keypad is positioned to cover a display region in part in an application non-driven mode according to the present invention.
Figure 5B:
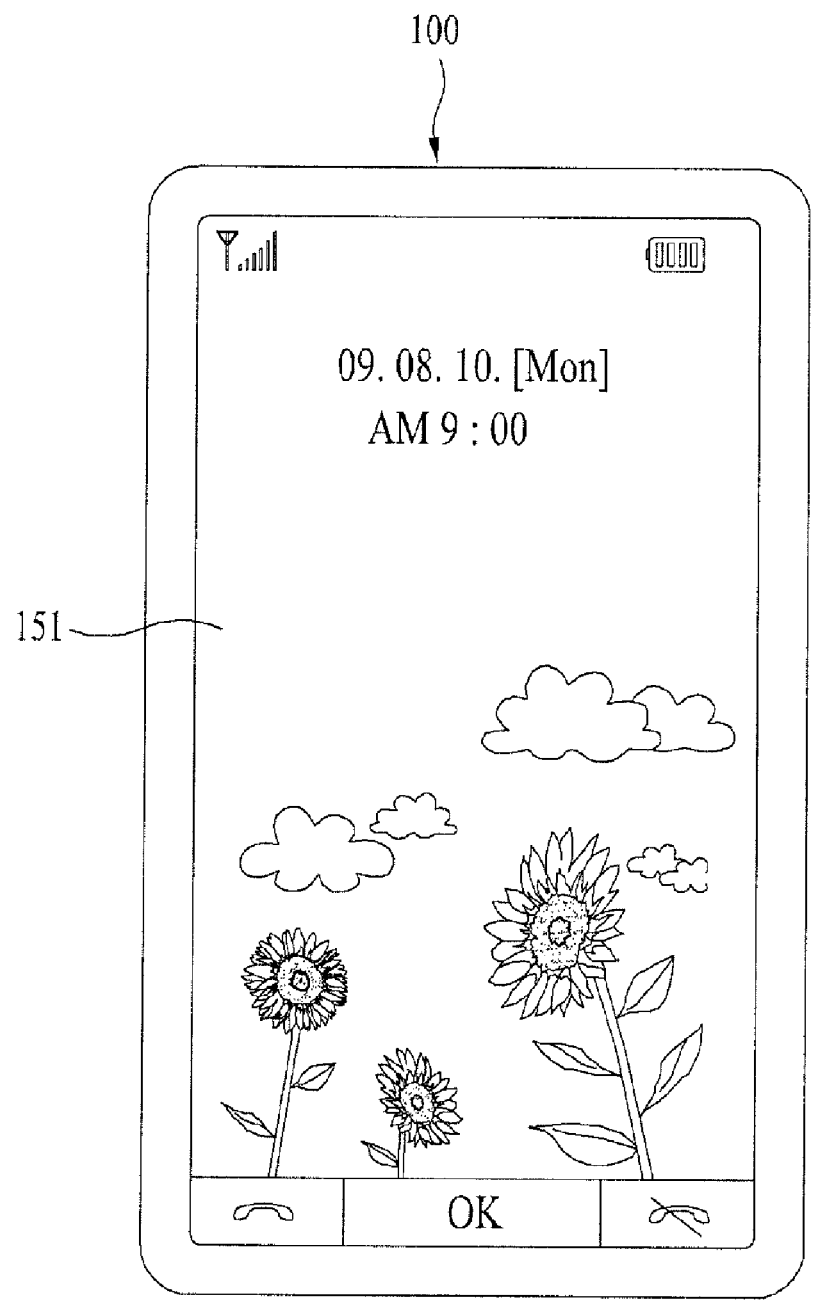
Figure 5C:
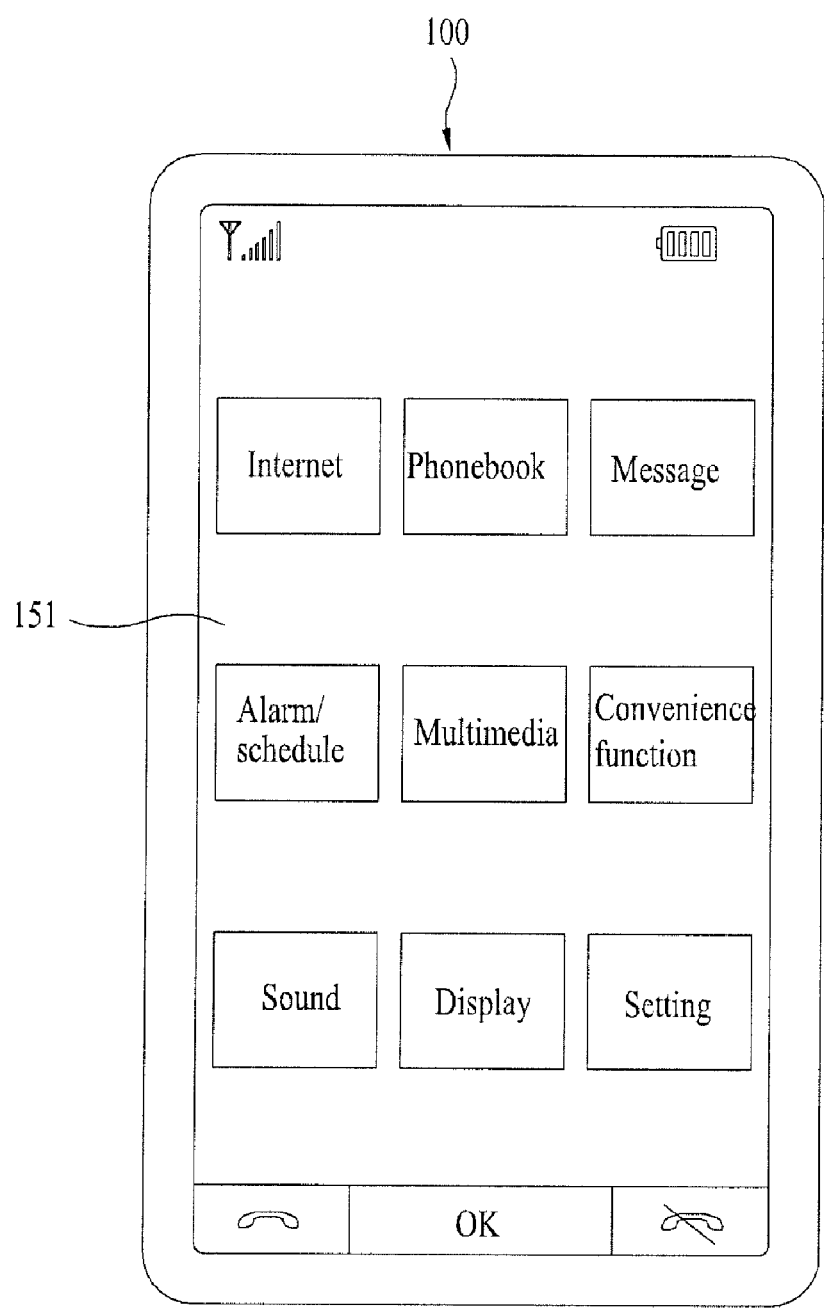

While any application is not driven, an application non-driven state can include a case that the display unit 151 is deactivated [FIG. 5A], a case that a background image is displayed [FIG. 5B], or a case that at least one menu item is displayed to enable a drive target application to be selected [FIG. 5C].

In the application non-driven state shown in one of FIGS. 5A to 5C, if a position of the keypad 131 is shifted to cover a partial display region, the mobile terminal 100 sets a control display mode and is then able to perform a display operation (hereinafter named a control display operation) corresponding to the control display mode in a control display region [FIG. 5D].

Figure 5D:
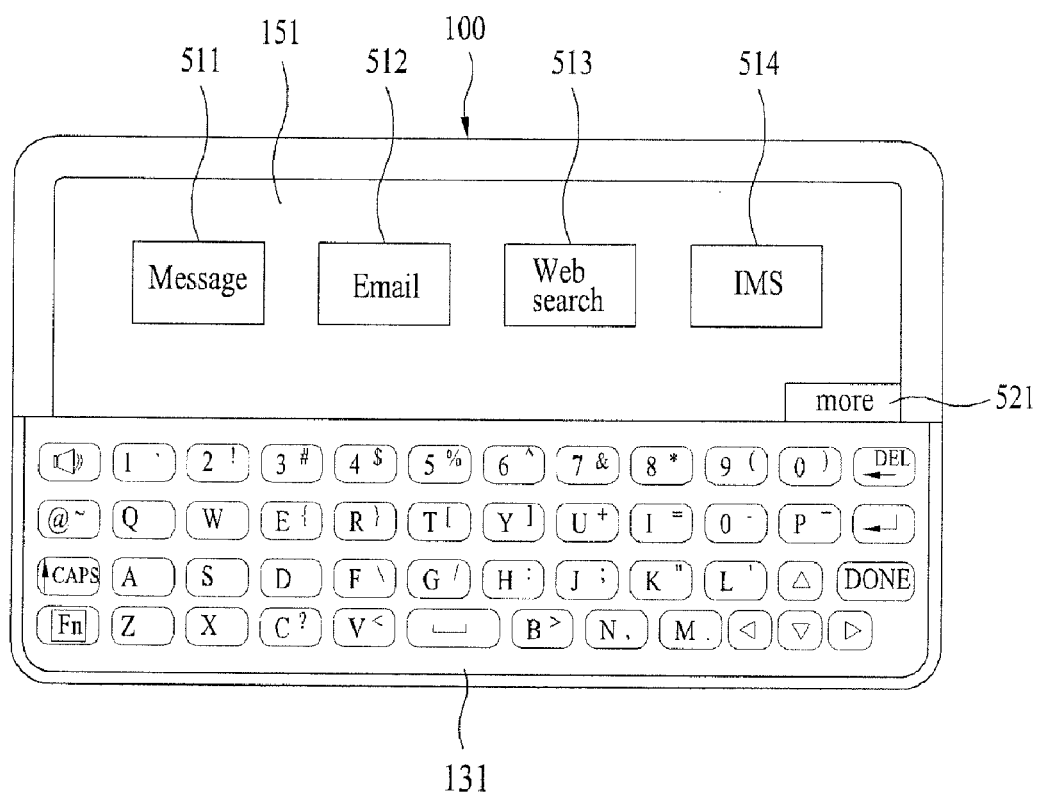

Referring to FIG. 5D, the control display operation can include an operation of displaying a menu item list constructed with at least one or more menu items 511 to 514 pre-designated to be provided in the control display mode. An action for designating a menu item to be provided in the control display mode will be explained in detail with reference to the accompanying drawings (FIGS. 8A to 8D) later.

For instance, the menu items 511 to 514 contained in the menu item list can be represented in one of various ways including a text, an icon, a still image, a video image, an animation, a flash and the like or can be represented as 3-dimensional images.

A menu item provided in a control display may differ per a type of an application non-driven state [cf. FIGS. 5A to 5C] [cf. an action for designating a menu item]. For instance, if a control display mode is entered in FIG. 5A, it is able to provide first to fourth menu items. If a control display mode is entered in FIG. 5B, it is able to provide third to sixth menu items. If a control display mode is entered in FIG. 5C, it is able to provide a first menu item, a third menu item, a fifth menu item and an eighth menu item.

Moreover, a display size of each one of the at least one or more menu items contained in a menu item list displayed in a control display mode may differ. For instance, the display size can differ according to a use frequency, a use time, a presence or non-presence of adding a bookmark or the like.

FIGS. 6A to 7B are various diagrams for displaying a menu item list in a control display region according to the present invention.

For clarity and convenience of the following description, assume that a menu item list provided in a control display mode includes total eight menu items.

Figure 6A:
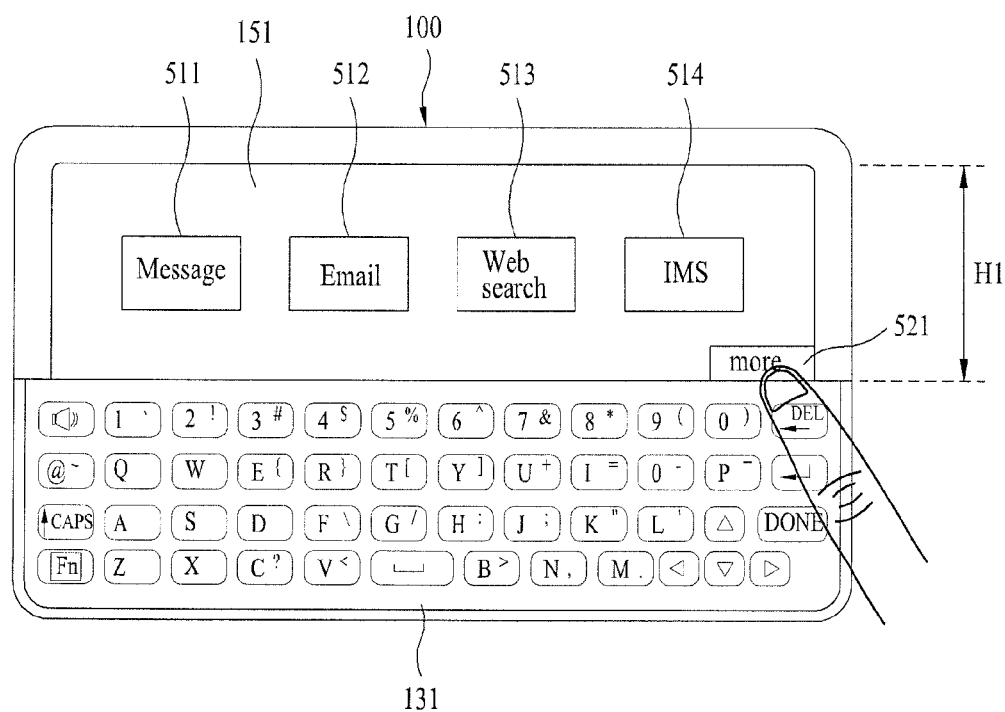
FIGS. 6A to 7B are diagrams for displaying a menu item list in a control display region according to the present invention.

Referring to FIG. 6A, the mobile terminal 100 is able to display a menu item list containing four menu items 511 to 514 in a control display region.

Figure 6B:
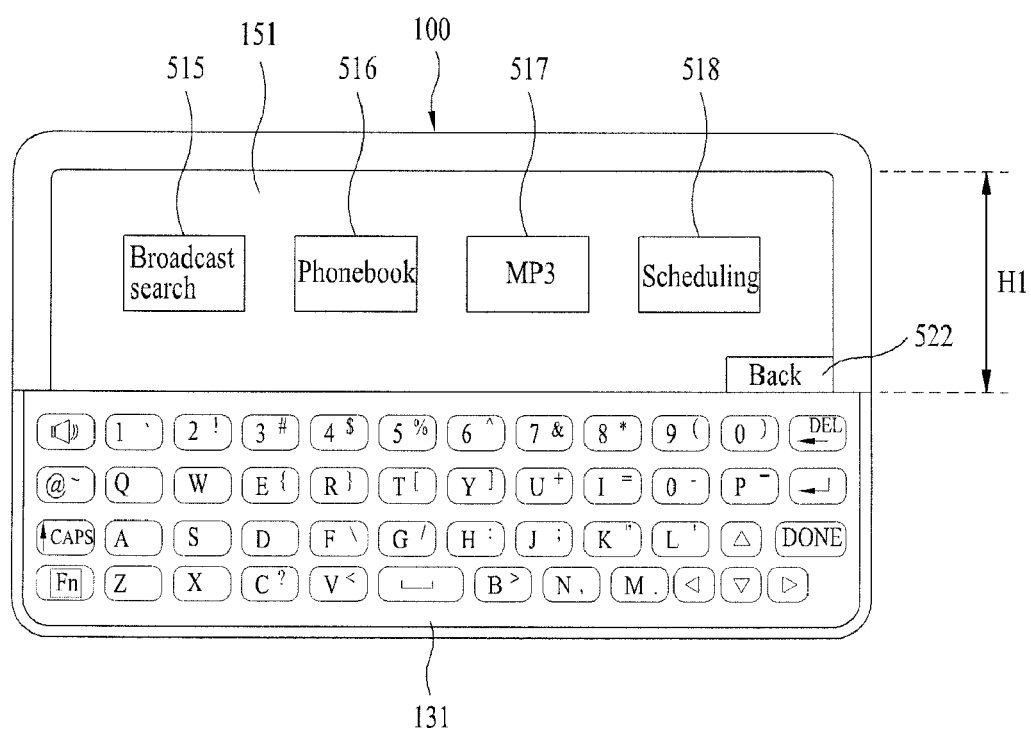
Figure 6C:
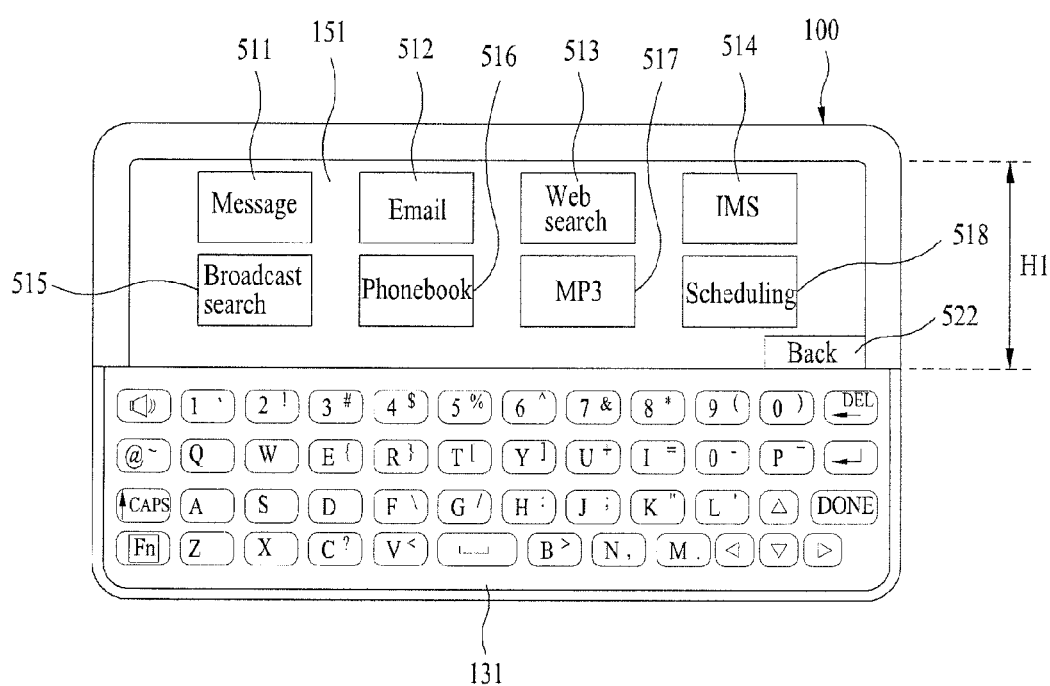

If a more view region 521 is activated in FIG. 6A, the mobile terminal 100 displays a menu item list containing four menu items located next to the former menu items displayed in FIG. 6A [FIG. 6B] or is able to display a menu item list containing all menu items 511 to 518 on one screen by reducing a display size of the menu item [FIG. 6C].

Meanwhile, if a back region 522 is activated in FIG. 6B or FIG. 6C, the mobile terminal 100 is able to return to the state shown in FIG. 6A.

Figure 7A:
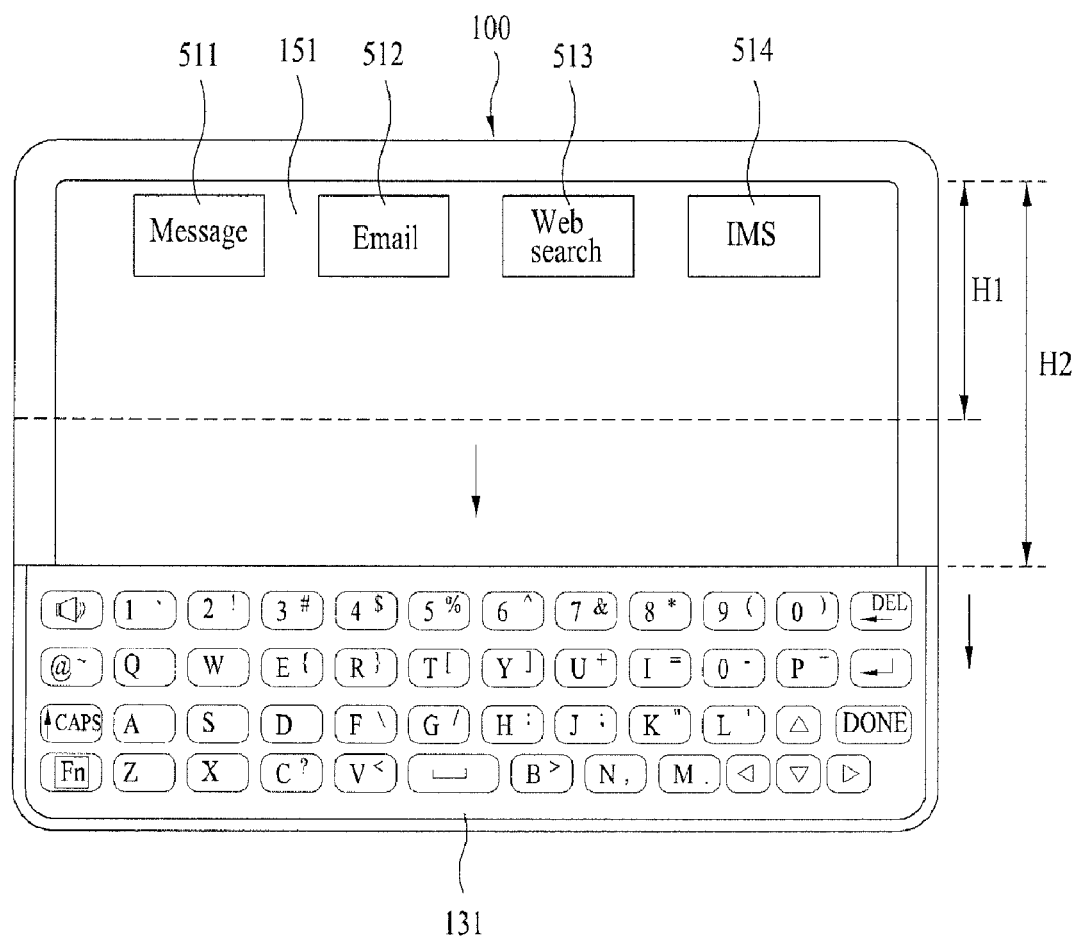
Figure 7B:
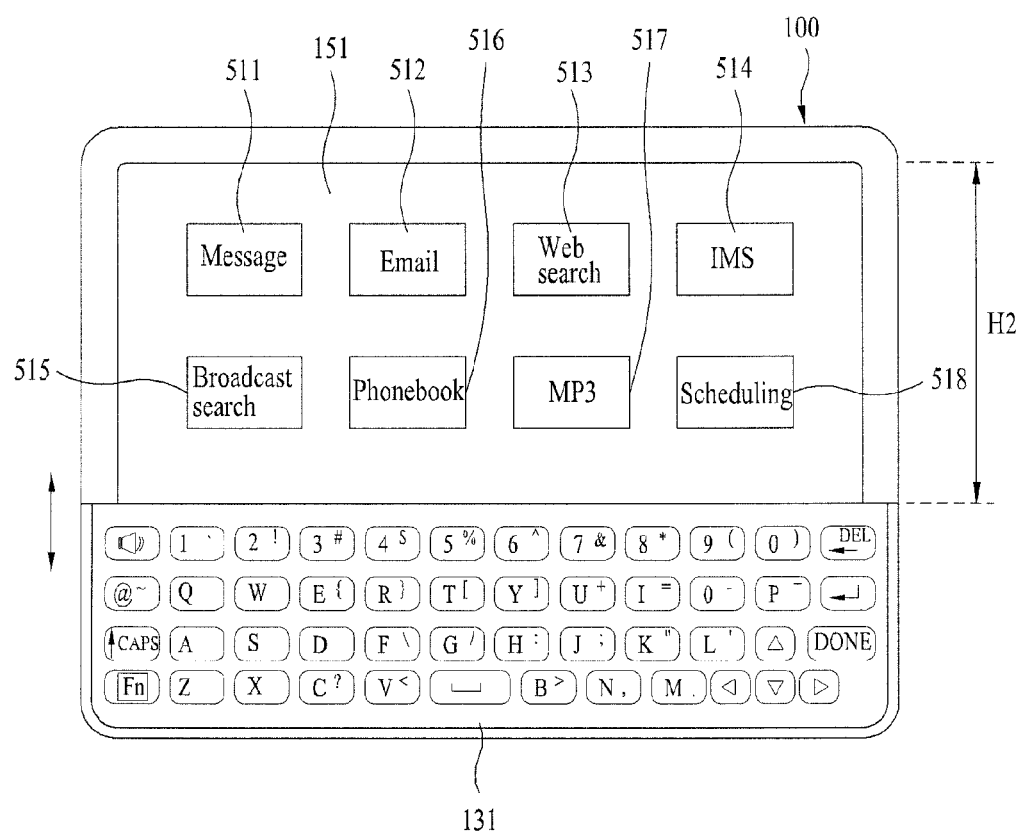

Referring to FIG. 7A and FIG. 7B, if a position of the keypad 131 is shifted to enable a control display region in the state shown in FIG. 6A to be increased by a prescribed size or more (e.g., a vertical length is increased by at least H2) [FIG. 7A], the mobile terminal 100 is able to display a menu item list containing all menu items 511 to 518 on one screen by reducing a display size of the menu item [FIG. 7B].

Meanwhile, if a vertical length of a control display region becomes shorter than H1 due to the position shift of the keypad shown in FIG. 7B, the mobile terminal 100 is able to return to the state shown in FIG. 6A.

FIGS. 8A to 8D are diagrams for managing a control display mode via a menu search according to the present invention.

Figure 8A:
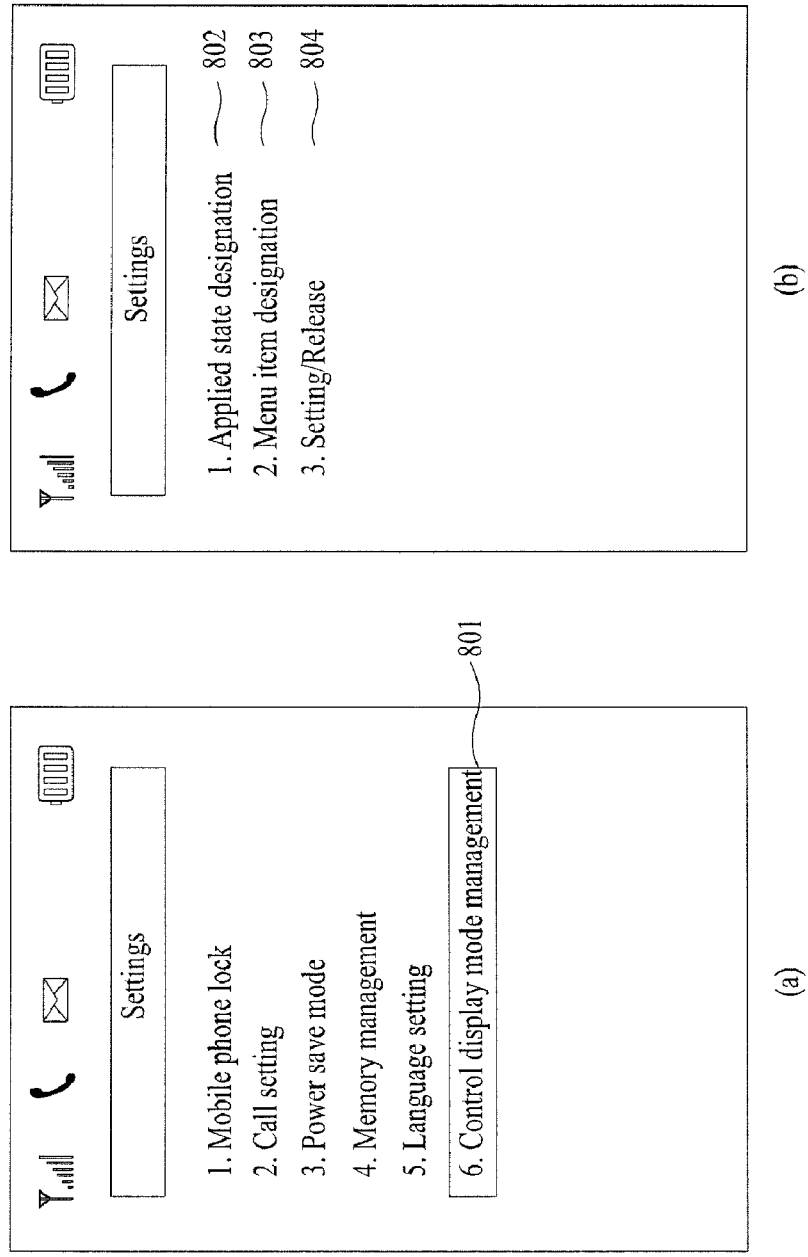

First of all, if a menu item 810 for a control display mode management is selected via a menu search, the mobile terminal 100 is able to display a sub-menu item list belonging to the control display mode management [FIG. 8A].

For instance, the sub-menu item list can contain an applied state designation 802, a menu item designation 803, a control display mode setting/release 804 and the like.

In the following description, the applied state designation for the control display mode is explained.

Referring to FIG. 8B, if the applied state designation 802 is selected in FIG. 8A, the mobile terminal 100 displays an applied state list and then enables a user to select a terminal state, to which a control display mode will be applied, from the displayed applied state list [a]. Therefore, if a position of the keypad 131 is shifted to indicate a partial display region of the display unit 151 in the terminal state selected by the user, the mobile terminal 100 is able to apply the control display mode.

For instance, the applied state list can contain such a control display mode applicable terminal state as an LCD deactivated state, a background image display state, a menu item display state, an application driven state, an overall state and the like.

If the application driven state is selected in FIG. 8B (a), the mobile terminal 100 displays an application list and then enables a user to select an application to which a control display mode shall be applied [b]. Therefore, if a position of the keypad 131 is shifted to indicate a partial display region of the display unit 151 in the application driven state selected by the user, the mobile terminal 100 is able to apply the control display mode.

In the following description, the designation of a menu item, which will be provided in a control display mode, is explained.

Referring to FIG. 8C, if the menu item designation 803 s selected in FIG. 8A, the mobile terminal 100 enables a user to select whether a designation will be made per terminal state (per-state designation) or in common to all states (overall designation) [a].

For instance, if the per-state designation is selected, the mobile terminal 100 is able to designate a menu item, which will be provided in a control display mode, for each terminal state according to a user selection. If the overall designation is selected, the mobile terminal 100 is able to designate a menu item, which will be provided in a control display mode for all terminal states, in common according to a user selection.

If the overall designation is selected in FIG. 8C (a), the mobile terminal 100 is able to designate the number (e.g., 4) of menu items, which will be provided in a control display mode, according to a user selection, and is also able to specifically designate a menu item, which will be provided in the control display mode, according to a user selection [b]. Therefore, if the control display mode is entered, the mobile terminal 100 is able to display a menu item list containing the menu item designated in FIG. 8C (b).

In the following description, the setting/release of a control display mode is explained.

Figure 8D:
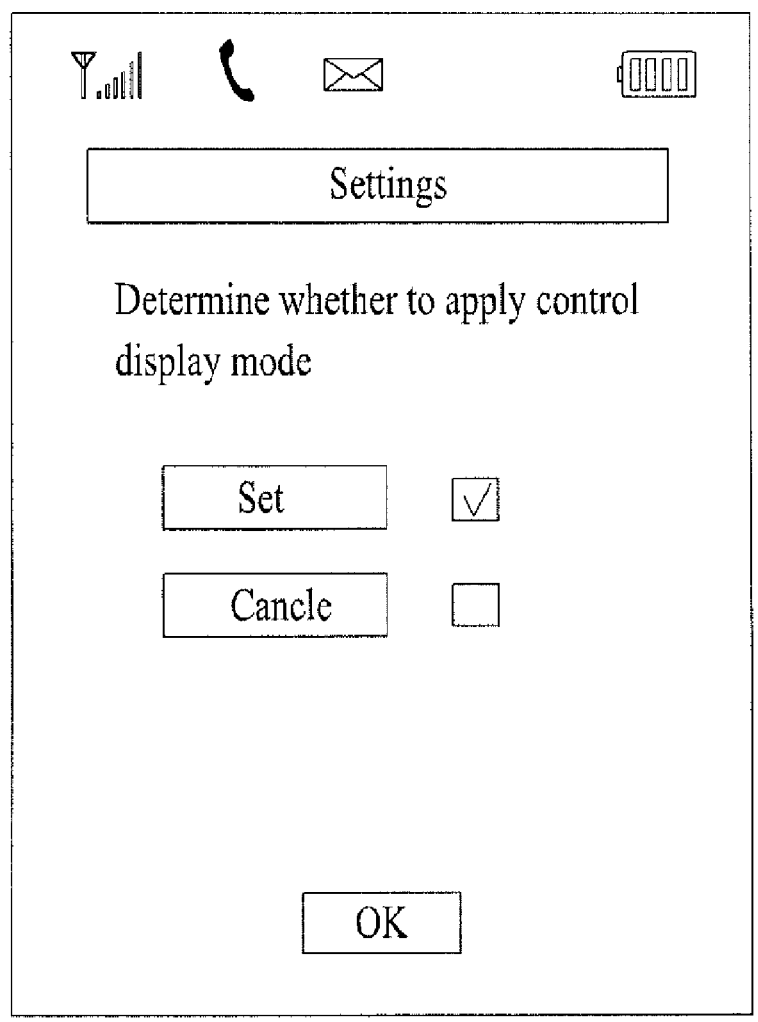

Referring to FIG. 8D, if the setting/release 804 is selected in FIG. 8S, the mobile terminal 100 is able to determine whether to set a control display mode according to a user selection.

For instance, if 'setting' is selected by a user, the mobile terminal 100 sets a control display mode to operate. If 'release' is selected by a user, the mobile terminal 100 is able to set a control display mode not to operate despite that the keypad 131 is positioned to cover the partial display region of the display unit 151.

In the drawing, shown is a case that a control display mode is managed in a normal display mode. Yet, it is understood that the above explained management operation of the control display mode is applicable in the control display mode as well.

In case that a specific menu item is selected from a menu item list (hereinafter named a control menu item list) displayed in a control display region in a control display mode, a display operation related to an application corresponding to the specific menu item is explained as follows.

FIGS. 9A to 9D are diagrams of screen configurations for a case that a message is selected from a menu item list displayed in a control display region according to the present invention.

Referring to FIG. 9A, if a message 511 is selected from a control menu item list [a], the mobile terminal 100 is able to display a message type list [b]. For instance, the message type list can contain a text message 511-1, a video message 511-2, a speech message 511-3, a still picture image 511-4 and the like.

If the text message 511-1 is selected in FIG. 9A (b), the mobile terminal 100 is able to display a text input window 901 for inputting to display recipient information (e.g., a phone number, a name stored in a phonebook, etc.) on a control display region [FIG. 9B (a)].

In this case, a cursor can be located in the text input window 901 to indicate that the recipient information can be inputted. A user directly inputs the recipient information by manipulating the keypad 131. A user selects information of a recent outgoing/incoming correspondent party as the recipient information by activating a recent number region 902. A user selects information of a correspondent party stored in a phonebook as the recipient information by activating a phonebook region 903. A user selects information of a correspondent party registered at a bookmark (favorites) by activating a 'favorites' region 904.

Therefore, the mobile terminal 100 is able to display the recipient information directly inputted by a user or the recipient information selected in one of the above described manners on the text input window 901 [FIG. 9B (b)].

Subsequently, if a 'done' key 131-1 is selected in FIG. 9B (b), the mobile terminal 100 completes the recipient information inputting procedure and is then able to display a text input window 911 for receiving an input of a message content to display [FIG. 9C (a)].

In this case, a cursor for indicating that a message content is inputtable can be located in the text input window 911. A user is able to input a message content by manipulating the keypad 131. The mobile terminal 100 is then able to display the message content inputted by the user on the text input window 911 [FIG. 9C (b)].

Subsequently, if a 'done' key 131-1 is selected in FIG. 9C (b), the mobile terminal 100 completes the message content inputting procedure and is then able to send a text message containing the written message content to a correspondent party terminal matching the inputted recipient information.

Figure 9D:
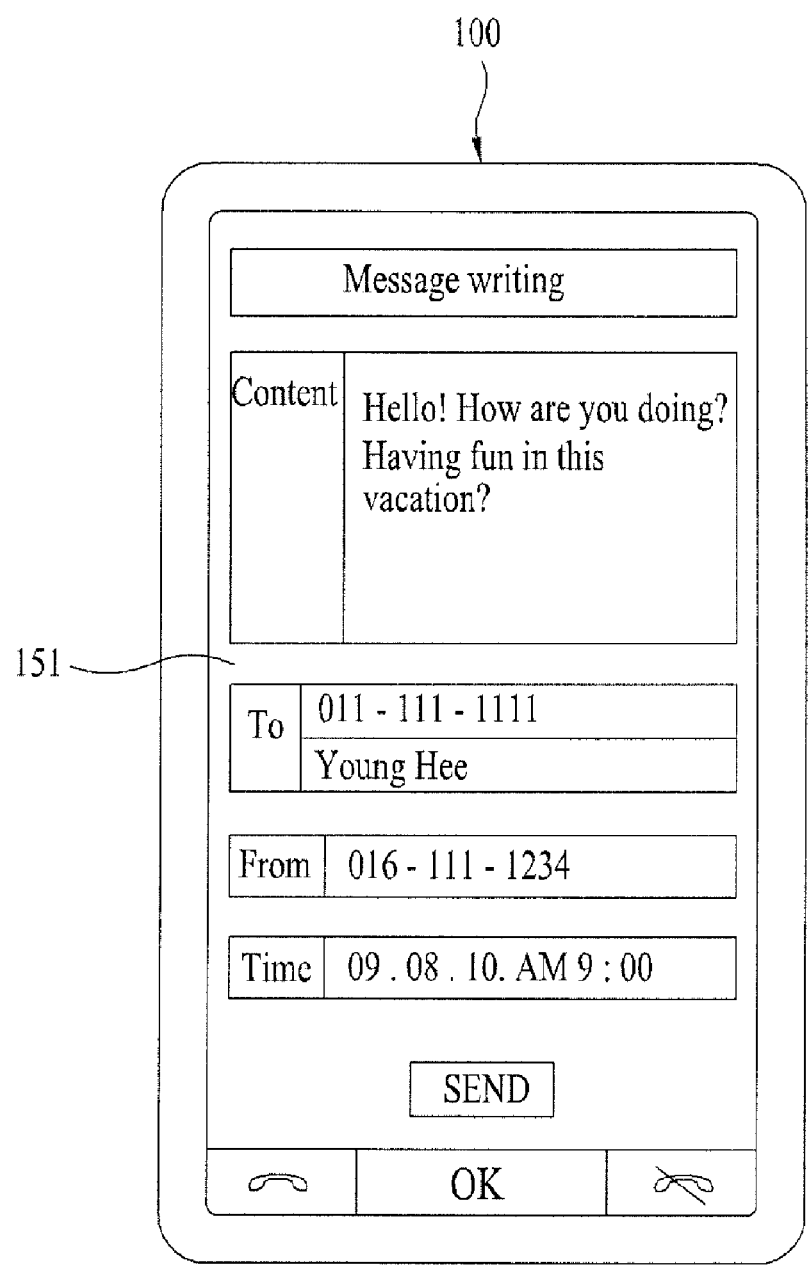

Meanwhile, if the keypad in the state shown in FIG. 9C (b) returns to an original position [cf. FIG. 2A], the mobile terminal 100 enters a normal display mode and is then able to display a message writing window containing the inputted recipient information and the inputted message content [FIG. 9D].

FIGS. 10A to 10F are diagrams of screen configurations for a case that an email is selected from a menu item list displayed in a control display region according to the present invention.

Figure 10A:
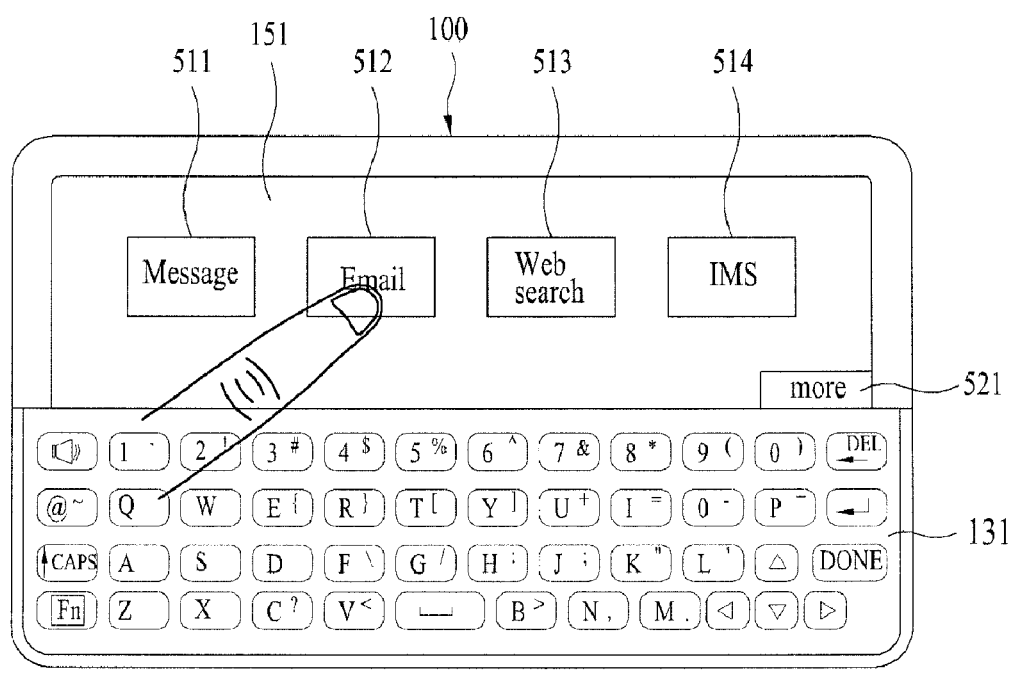

Referring to FIG. 10A, the email 512 can be selected for the mobile terminal 100 from the control menu item list.

If the email 512 is selected in FIG. 10A, the mobile terminal 100 is able to display a text input window 100 for receiving and displaying an input of recipient information (e.g., an email address, a name stored in a phonebook, etc.) on a control display region [FIG. 10B (a)].

In this case, a cursor can be located within the text input window 1001 to indicate that the recipient information can be inputted thereto. A user directly inputs the recipient information by manipulating the keypad 131. A user selects correspondent party information (or an email address) stored in a phonebook as the recipient information by activating an address list region 1002. A user selects information of a recent outgoing correspondent party as the recipient information by activating a recent outgoing region 1003. A user is able to select information of a recent incoming correspondent party as the recipient information by activating a recent incoming region 1004.

Therefore, the mobile terminal 100 is able to display the recipient information directly inputted by a user or the recipient information selected in one of the above described manners on the text input window 100 [FIG. 10B (b)].

If a 'done' key 131-1 is selected in FIG. 10B (b), the mobile terminal 100 completes the recipient information inputting procedure and is then able to display a text input window 1001 for receiving and displaying an input of an email title [FIG. 10C (a)]. In this case, a cursor can be located within the text input window 1011 to indicate that the email title is inputtable thereto.

After the email title has been inputted via a manipulation of the keypad 31, if the 'done' key 131-1 is selected, the mobile terminal 100 completes the email title inputting procedure and is then able to place a cursor on an attachment file input window 1012 to indicate that an attachment file is inputtable thereto [FIG. 10C (b)].

If a photo 1013 is selected from data items (including photo 1013, video 1014, audio 1015 and document 1016) shown in FIG. 10C (b), the mobile terminal 100 is able to display photos 1021 to 1024 stored in a photo storage region of the memory 160 in thumbnail format on a control display region [FIG. 10D (a)]. In this case, if it is unable to display the photos on one screen, it is able to display them by sliding motion automatically or according to a user selection.

In FIG. 10D (a), if a photo to be attached as an attachment file is selected to correspond to a manipulation of a direction key 131-2 by a user and a 'done' key 131-1 is then selected, the mobile terminal 100 ends the attachment photo selecting procedure and is then able to set the state shown in FIG. 10D (b).

Figure 10E:
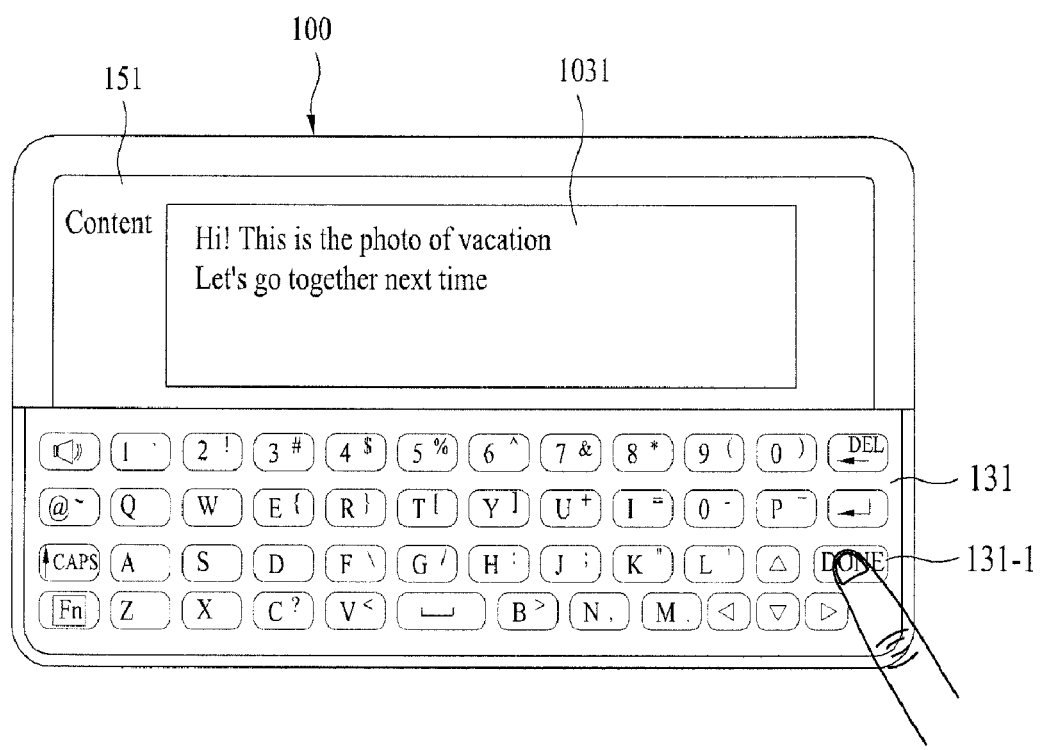

If the 'done' key 131-1 is selected in FIG. 10D (b), the mobile terminal 100 completes the attachment file inputting procedure, displays a text input window 1031 for receiving and displaying an email content, and is then able to display the email content inputted via a manipulation of the keypad 131 on the text input window 1031 [FIG. 10E].

If the 'done' key 131-1 is selected in FIG. 10E, the mobile terminal 100 completes the email content inputting procedure and is then able to send the email containing the written email content (attachment file included) as the inputted recipient information.

Figure 10F:
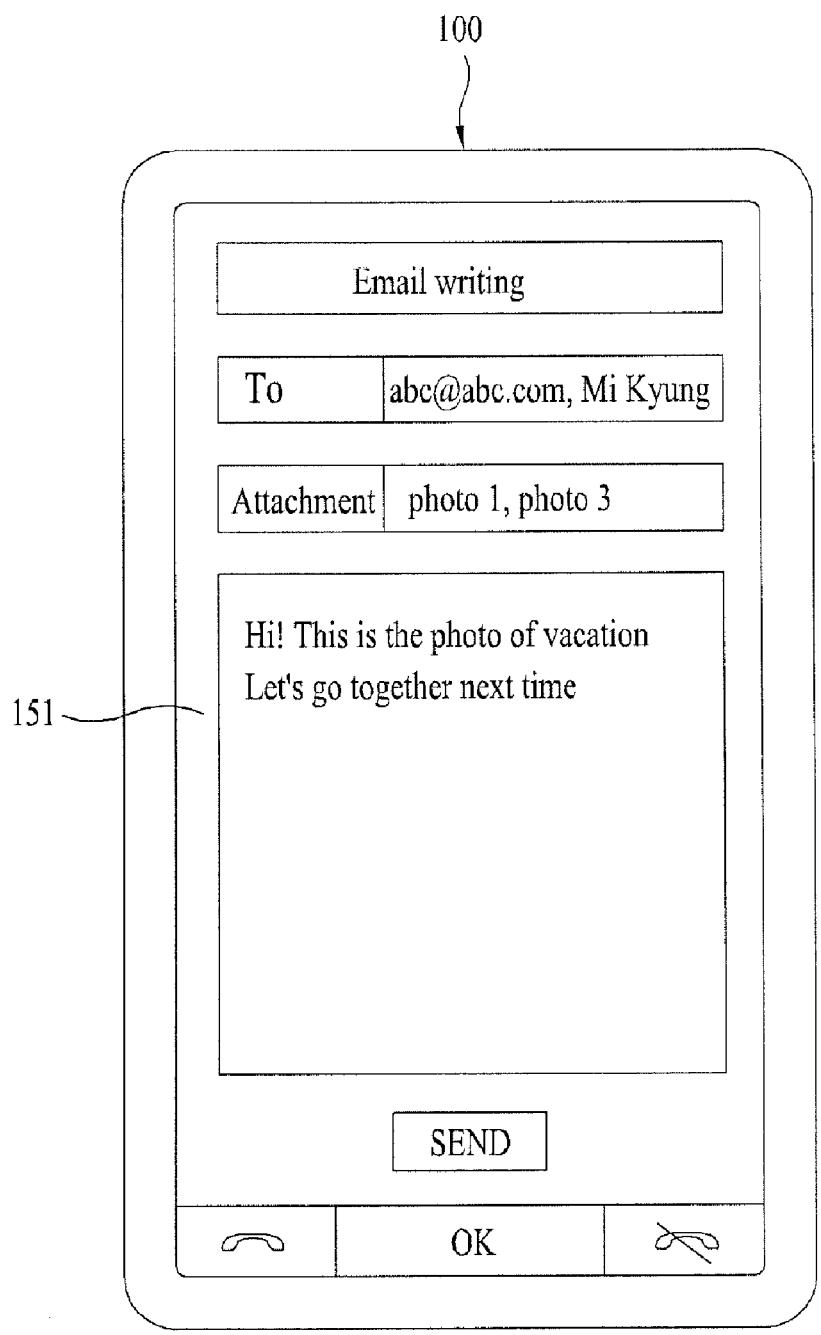

Meanwhile, in case that the keypad shown in FIG. 10E returns to its original position [cf. FIG. 2A], the mobile terminal 100 enters the normal display mode and is then able to display the email writing window containing the inputted recipient information, the attachment file and the email content [FIG. 10F].

FIGS. 11A to 11E are diagrams of screen configurations for a case that a web search is selected from a control menu item list.

Figure 11A:
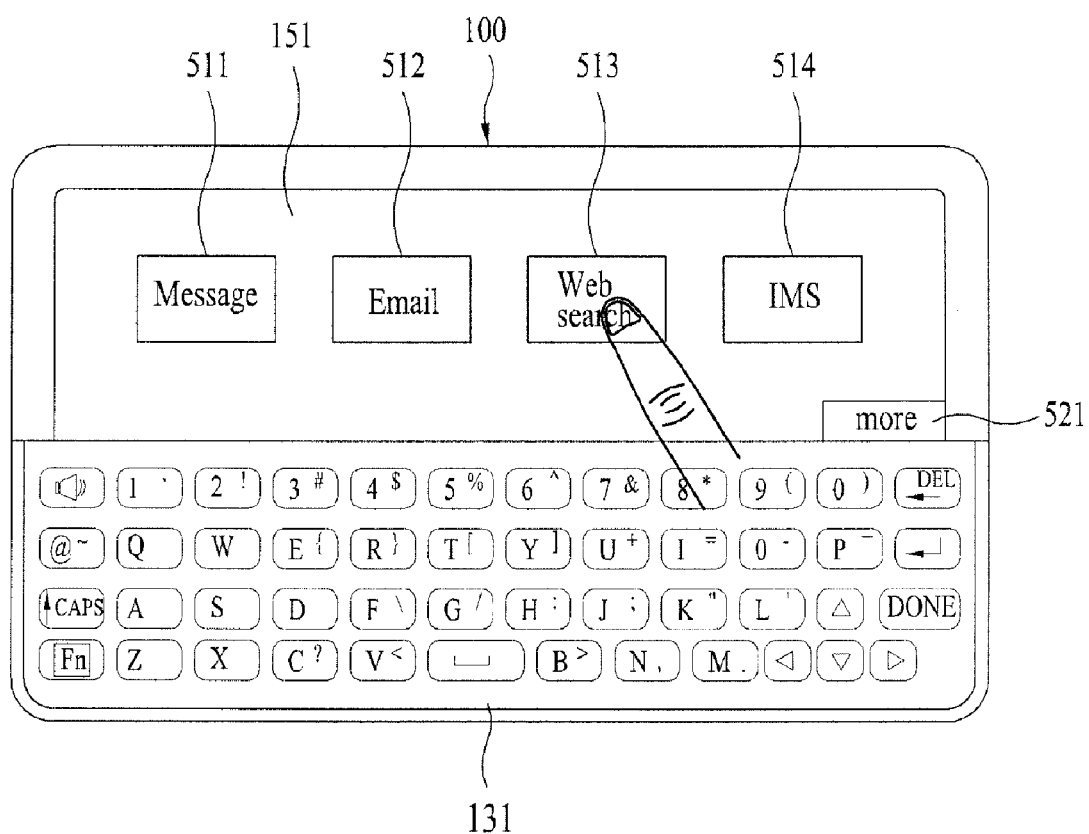

Referring to FIG. 11A, a web search 513 can be selected for the mobile terminal 100 from a control menu item list.

If the web search 513 is selected in FIG. 11A, the mobile terminal 100 displays a website list 1110 constructed with addresses of searchable websites on a control display region [FIG. 11B (a)] or is able to display a text input window 1120 for receiving an input of a website address on a control display region [FIG. 11B (b)].

For instance, a user selects an address of a website to access by manipulating a direction key 131-2 included in the keypad 131 [FIG. 11B (a)] or is able to directly input a website address via a manipulation of the keypad 131 [FIG. 11B (b)].

After completion of the selection or input of the website address, if a 'done' key 131-1 is selected, the mobile terminal 100 is able to access a website corresponding to the selected website address or the inputted website address.

As the website is accessed, the mobile terminal 100 is able to display address information 1101 of the accessed website and a keyword input window 1102 on the control display region [FIG. 11C (a)] and is able to display a keyword inputted via a manipulation of the keypad 131 on the keyword input window 1102 [FIG. 11C (b)].

In case that a web search 513 is selected from the control menu item list, the mobile terminal 100 directly accesses a specific website and then able to configure the image shown in FIG. 11C (a). In this case, the state shown in FIG. 11B can be omitted.

After completion of the keyword input, if a 'done' key 131-1 is selected, the mobile terminal 100 searches for web information corresponding to inputted keyword and is then able to display the searched web information [FIG. 11D].

Figure 11E:
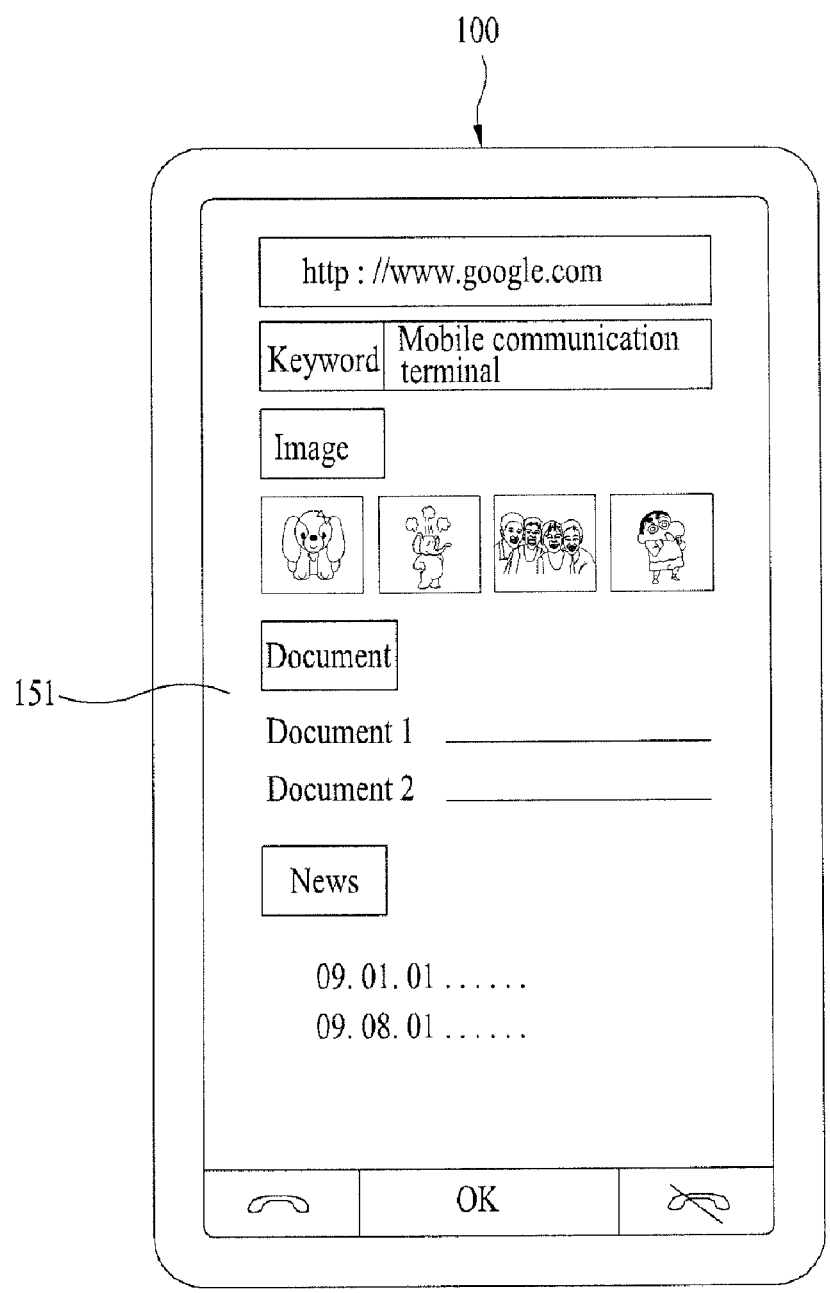

Meanwhile, if the keypad returns to its original position from the state shown in FIG. 11D [cf. FIG. 2A], the mobile terminal 100 enters the normal display mode and is then able to display a webpage (the search result included) provided by the accessed website [FIG. 11E].

Figure 12C:
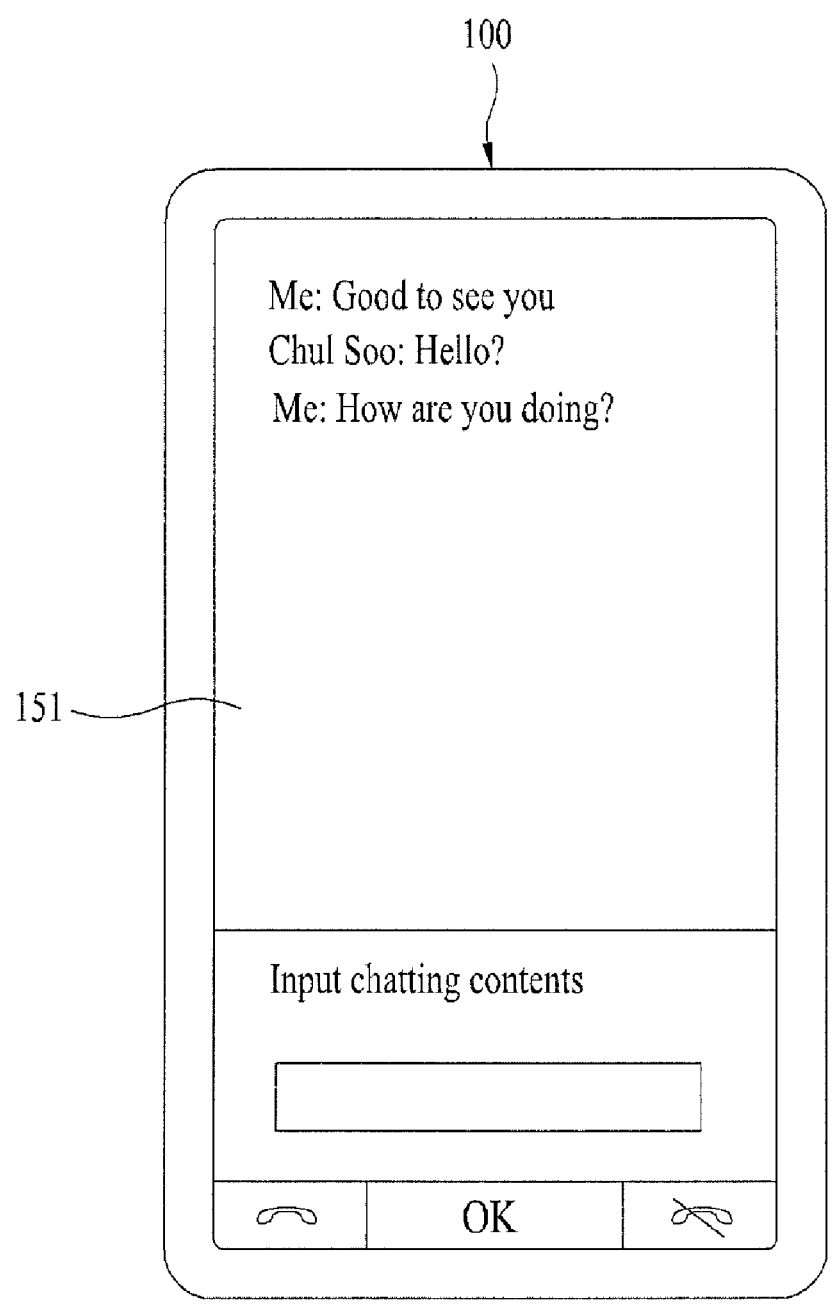

FIGS. 12A to 12C are diagrams of screen configurations for a case that an IMS is selected from a control menu item list.

Referring to FIG. 12A, if an IMS 514 is selected from a control menu item list [a], the mobile terminal 100 displays a chatting correspondent party list on a first region 1210 of a control display region and is able to display an IMS related function key on a second region 1220 of the control display region.

For instance, a user is able to select a specific correspondent party 1211 from the chatting correspondent party list by manipulating a direction key 131-2 included in the keypad 131 and is also able to have a specific function key 1221 selected from the IMS related function key 1221.

In FIG. 12A (b), 'Chul Soo' is selected as the specific correspondent party 1211, 'chat' is selected as the function key 1221, and a 'done' key 131-1 is then selected. If so, the mobile terminal 100 is able to display a chatting window with Chul Soo (chatting content display window and chatting window included) on the control display region [FIG. 12B].

In FIG. 12B, the mobile terminal 100 displays the chatting content inputted by manipulating the keypad 131 on the chatting input window 1231. If the 'done' key 131-1 is selected, the mobile terminal 100 is able to display the chat content displayed on the chatting input window 1231 on the chatting content display window.

Meanwhile, if the keypad returns to its original position from the state shown in FIG. 12B [cf. FIG. 2A], the mobile terminal 100 enters the normal display mode and is then able to display the chatting window [FIG. 12C].

The selection for the specific menu item from the control menu item list can be performed by a manipulation of the direction or numeral keys included in the keypad 131 [not shown in the drawing].

Besides, despite the same application, it is able to display a different execution image in a normal display mode or a control display mode.

Subsequently, a sate of performing a display operation corresponding to a control display mode in an application driven state is explained as follows.

Figure 13A:
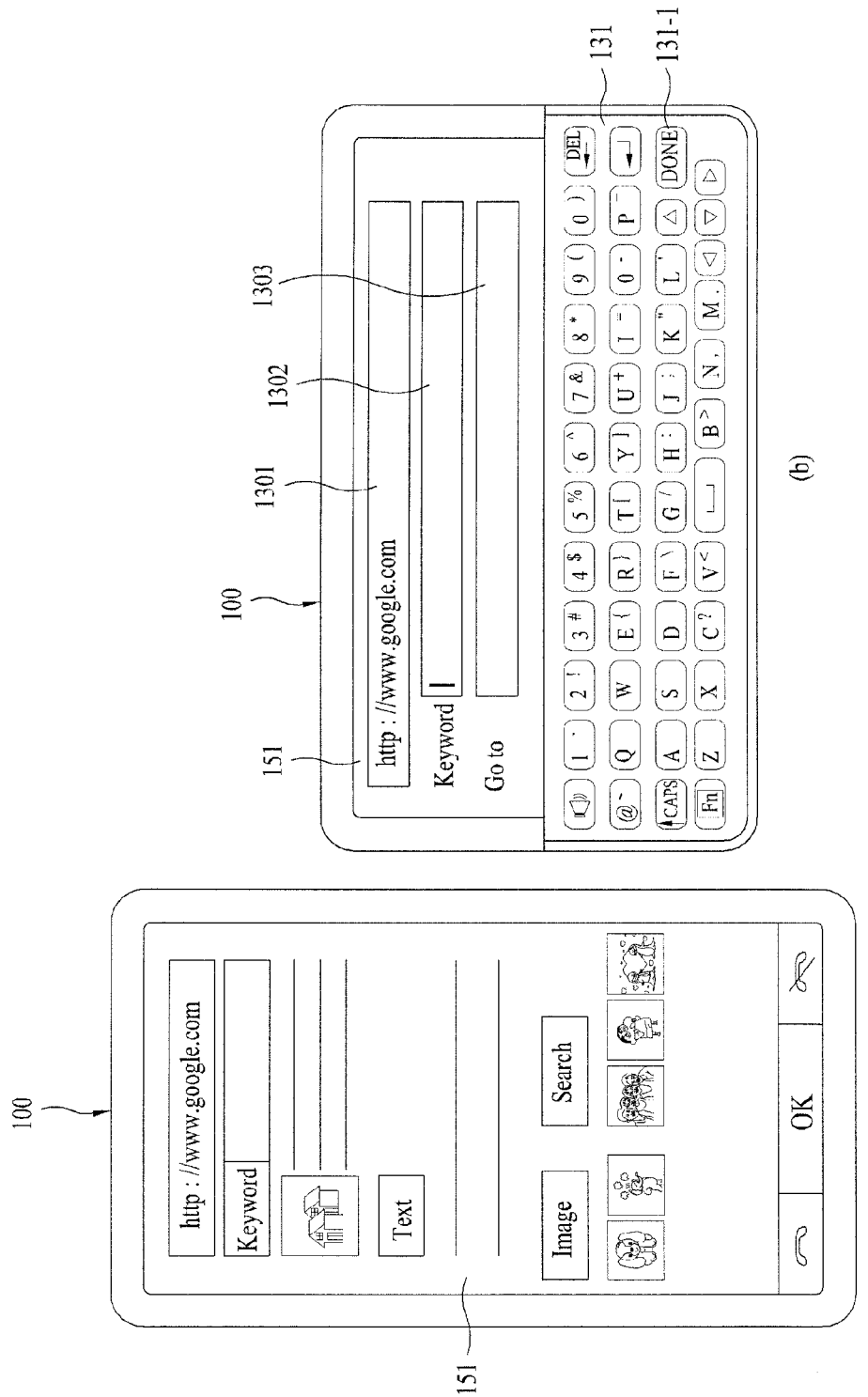

FIGS. 13A to 13C are diagrams of screen configurations for a case that a keypad is positioned to cover a partial display region in a web search application driven mode.

Referring to FIG. 13A, if a specific website is accessed, the mobile terminal 100 displays a webpage provided by the accessed website in a vertical view state [a].

If a position of the keypad 131 is shifted to cover a partial display region of the display unit 151 in the state shown in FIG. 13A (a), the mobile terminal 100 enters a horizontal view state and is then able to display a website access image corresponding to a control display mode on a control display region by maintaining the website access status [b].

For instance, an address display window 1301, a text input window 1302 for receiving and displaying a keyword and a text input window 1303 for receiving and displaying an address of a website to be accessed can be displayed on the website access image corresponding to the control display mode.

Referring to FIG. 13B, if a keyword (e.g., a mobile communication terminal) is inputted by a user's manipulation of the keypad 131, the mobile terminal 100 displays the inputted keyword on the text input window 1302 [a]. If the 'done' key 131-1 is selected, the mobile terminal 100 is able to display a search result with reference to the inputted keyword on the control display region [b].

Referring to FIG. 13C, if an address (e.g., http://www.navar.com) of a website to be accessed is inputted by a user's manipulation of the keypad 131, the mobile terminal 100 displays the inputted address on the text input window 1303 [a]. If the 'done' key 131-1 is selected, the mobile terminal 100 accesses the web site corresponding to the inputted address and is then able to display a website access image corresponding to the control display mode on the control display region [b].

Figure 14C:
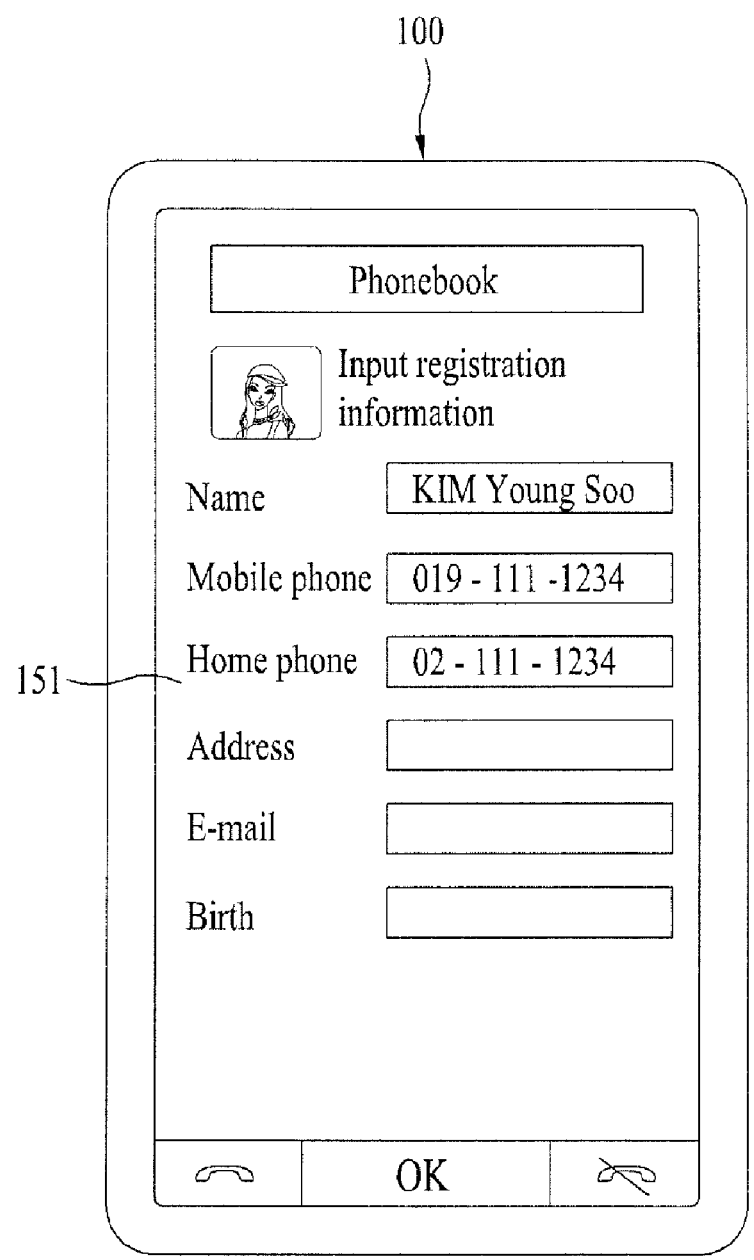

FIGS. 14A to 14C are diagrams of screen configurations for a case that a keypad is positioned to cover a partial display region in a phonebook registration application driven mode according to the present invention. For clarity and convenience of the following description, assume that three rows can be displayed on one screen.

Referring to FIG. 14A, as a phonebook registration application is driven, the mobile terminal 100 is able to display an image for receiving an input of registration information on a specific correspondent party in a vertical view state [a].

For instance, the registration information is divided into total six items and can include a name, a mobile phone number, a home phone number, an address, an email address and a birthday for example.

If a position of the keypad 131 is shifted to cover a partial display region of the display unit 151 in the state shown in FIG. 14A (a), the mobile terminal 100 enters a horizontal view state and is able to display an image for receiving an input of registration information on three items (name, mobile phone, home phone number) on a control display region [b].

Referring to FIG. 14B, after completion of the registration information input of the three items, if a 'done' key 131-1 is selected [a], the mobile terminal 100 is able to display an image for receiving an input of registration information on next three items (address, email address, birthday) on the control display region [b].

Meanwhile, if the keypad returns to its original position from the state shown in FIG. 14B (cf. FIG. 2A), the mobile terminal 100 enters the horizontal view state and is then able to display a registration information input image including the registration information on the inputted three items [FIG. 14C].

Figure 15A:
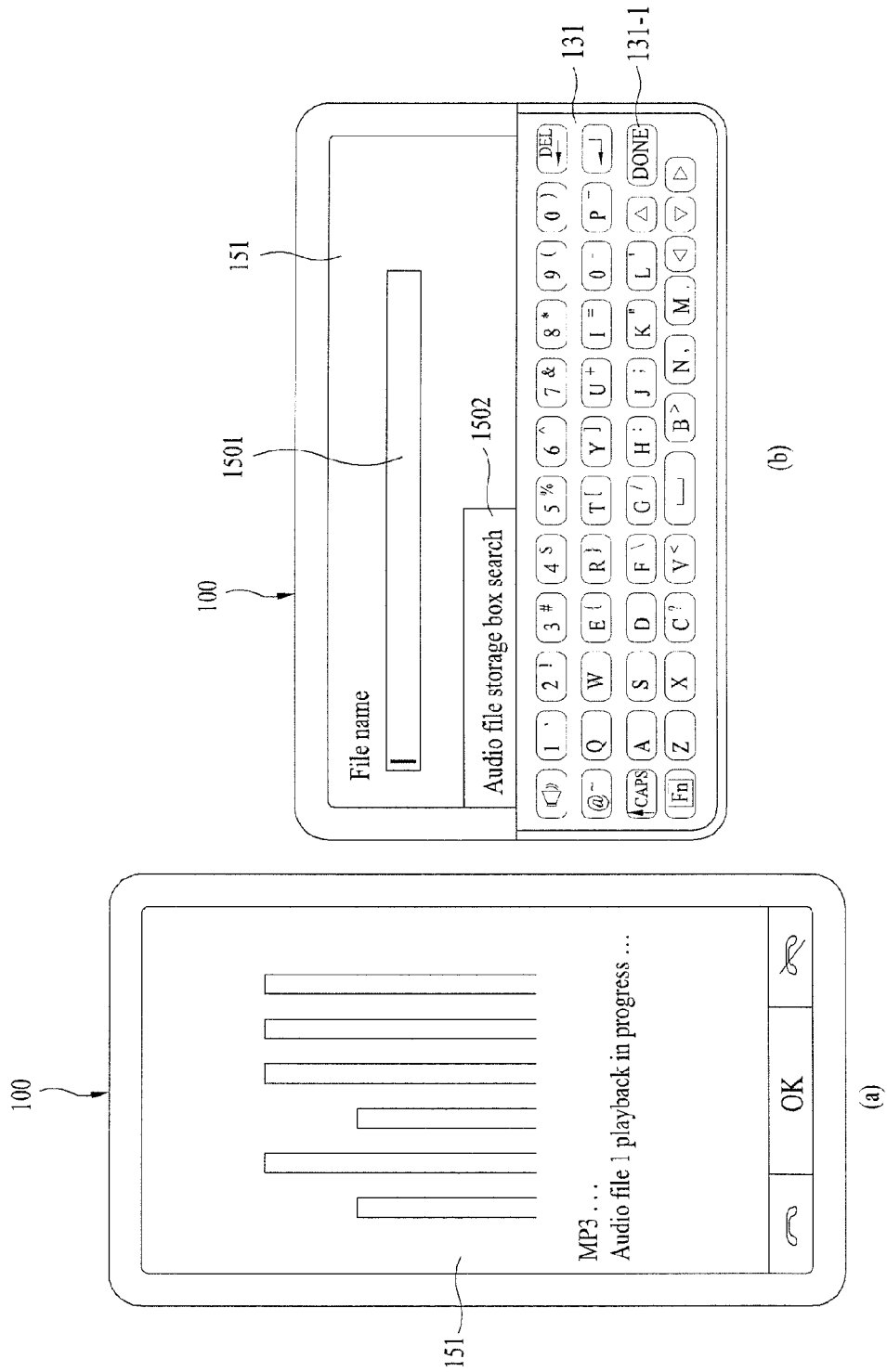
Figure 15C:
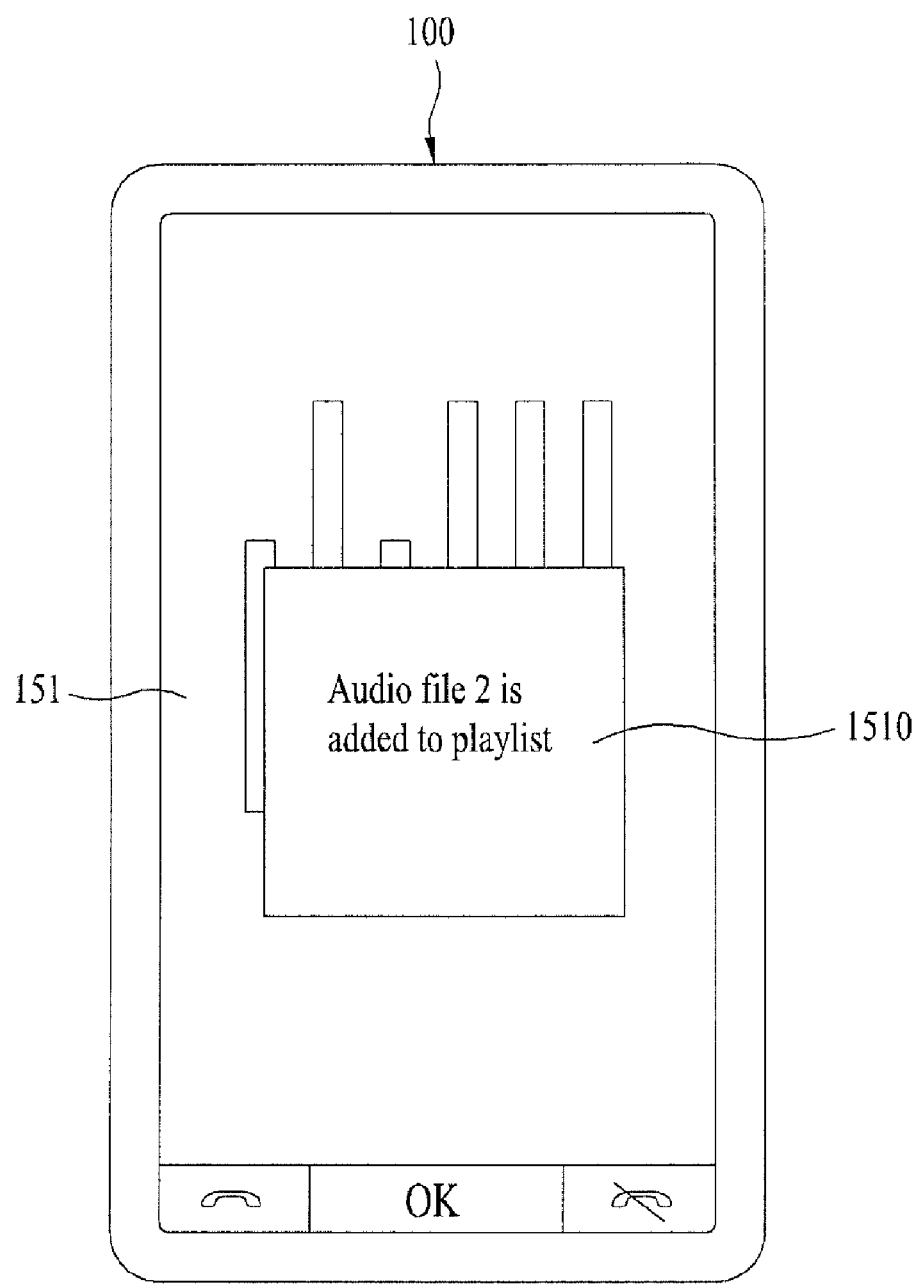

FIGS. 15A to 15C are diagrams of screen configurations for a case that a keypad is positioned to cover a partial display region in an MP3 play application driven mode according to the present invention.

Referring to FIG. 15A, the mobile terminal 100 is able to display play state information according to an MP3 playback in a vertical view state on a screen [a].

If a position of the keypad 131 is shifted to cover a partial display region of the display unit 151 in the state shown in FIG. 15A (a), the mobile terminal 100 enters a horizontal view state and is then able to display a text input widow 1501 for receiving an input of a name of an audio file to search and a menu item 1502 for an audio file storage box search.

Referring to FIG. 15B (a), the mobile terminal is able to display an audio file name directly inputted by a user according to a manipulation of the keypad 131 on a text input window 1501-1 or 1501-2.

Referring to FIG. 15B (b), if the menu item 1502 for the audio file storage box search is selected, the mobile terminal 100 is able to display an audio file list.

If a 'done' key 131-1 is selected in the state shown in FIG. 15B (a) or FIG. 15B (b), an audio file corresponding to the name directly inputted by a user or an audio file selected from the audio file list can be included in the play list by the mobile terminal 100.

Meanwhile, if the keypad returns to its original position from the state shown in FIG. 15B [cf. FIG. 2A], the mobile terminal 100 enters a vertical view state and then displays audio file information 1510 included in the play list in a control display mode while displaying the MP3 play state information [FIG. 15C].

Figure 16:
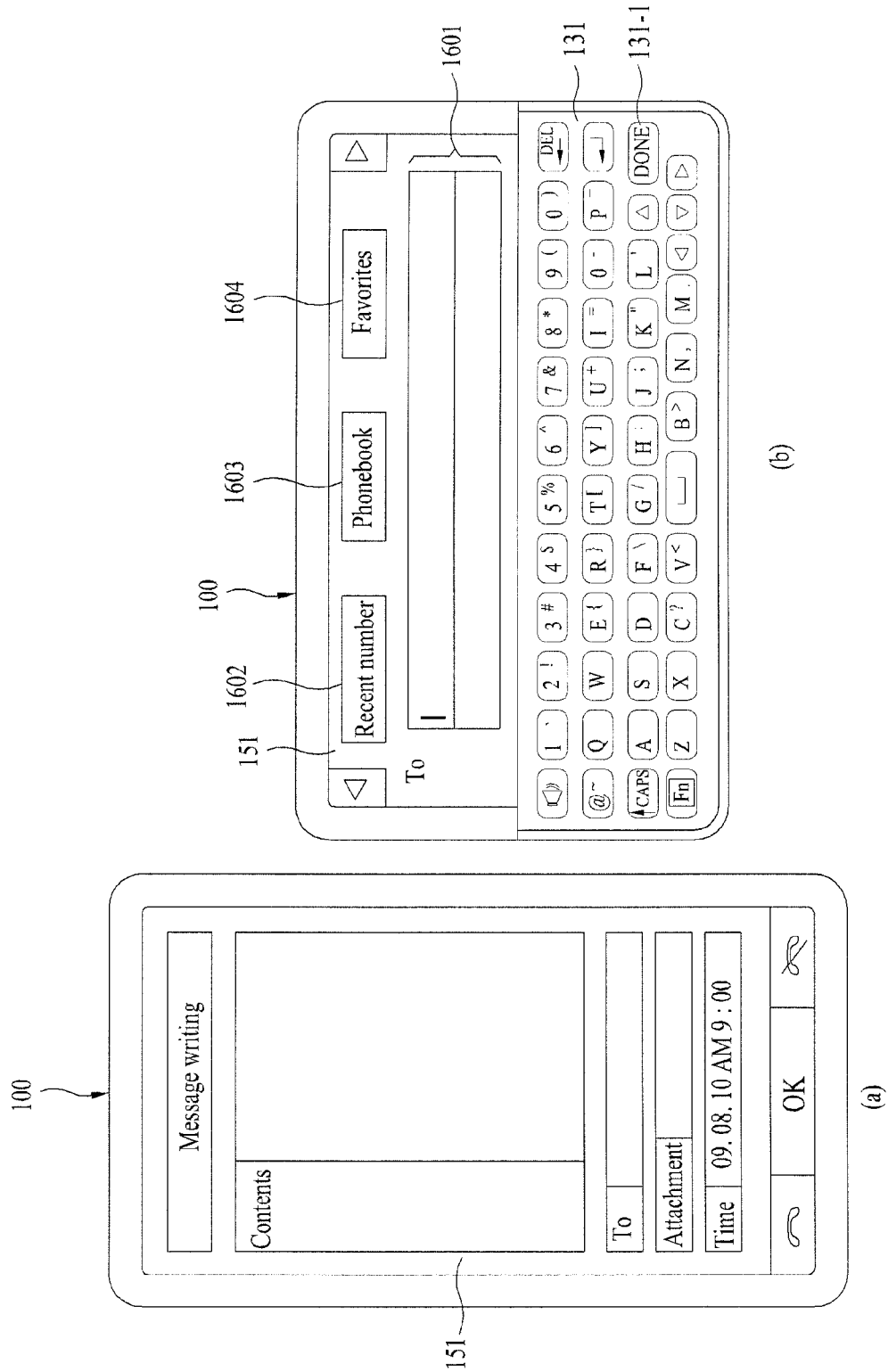
FIG. 16 is a diagram of screen configurations for a case that a keypad is positioned to cover a partial display region in a message writing application driven mode according to the present invention.

FIG. 16 is a diagram of screen configurations for a case that a keypad is positioned to cover a partial display region in a message writing application driven mode according to the present invention.

Referring to FIG. 16, if a position of the keypad 131 is shifted to cover a partial display region of the display unit 151 in a message writing state, the mobile terminal 100 is able to display a message writing window (cf. FIG. 9B and FIG. 9C) in a control display mode.

Figure 17:
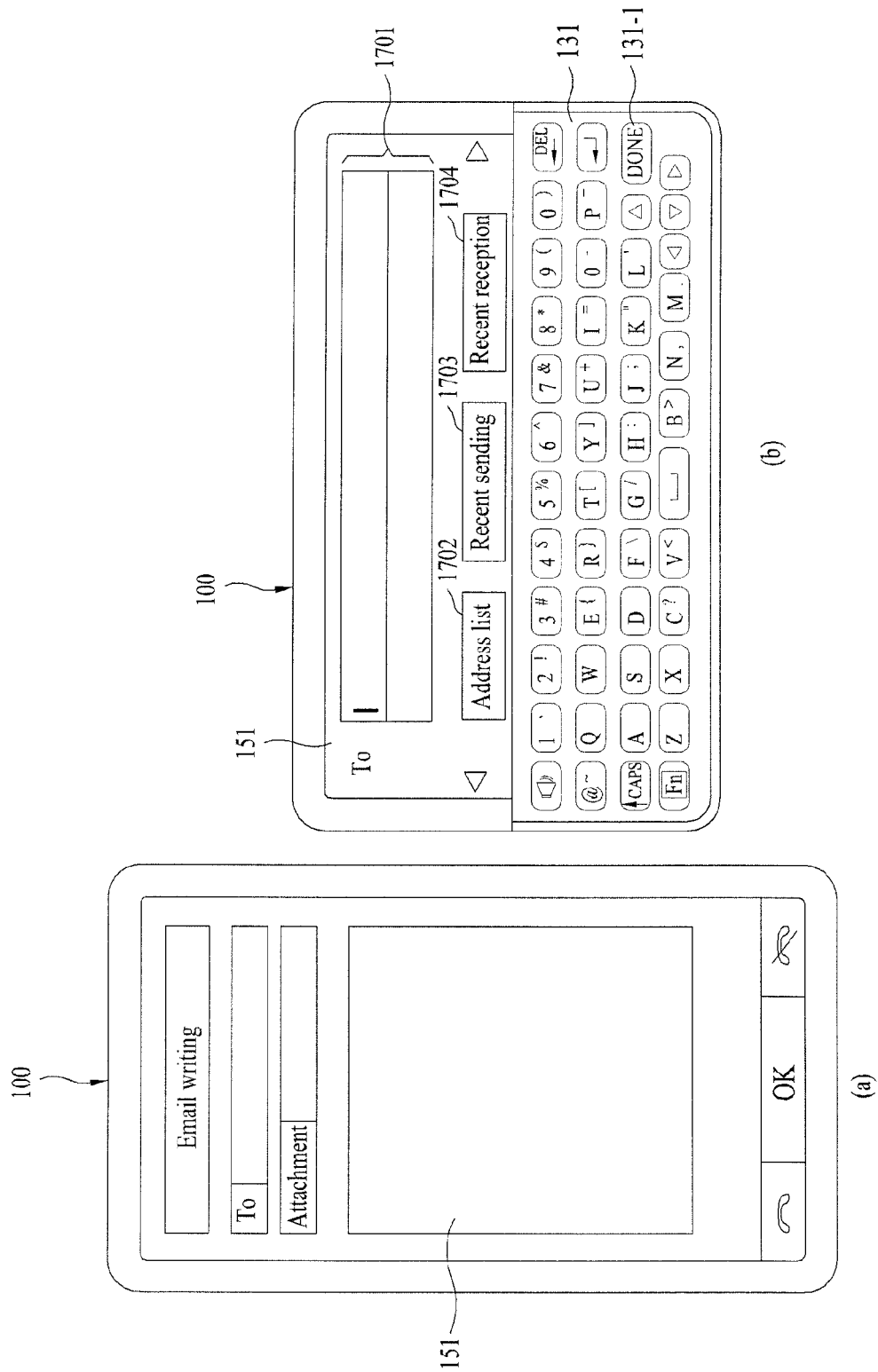
FIG. 17 is a diagram of screen configurations for a case that a keypad is positioned to cover a partial display region in an email writing application driven mode according to the present invention.

FIG. 17 is a diagram of screen configurations for a case that a keypad is positioned to cover a partial display region in an email writing application driven mode according to the present invention.

Referring to FIG. 17, if a position of the keypad 131 is shifted to cover a partial display region of the display unit 151 in an email writing state, the mobile terminal 100 is able to display an email writing window (cf. FIG. 10B and FIG. 10E) in a control display mode.

Figure 18A:
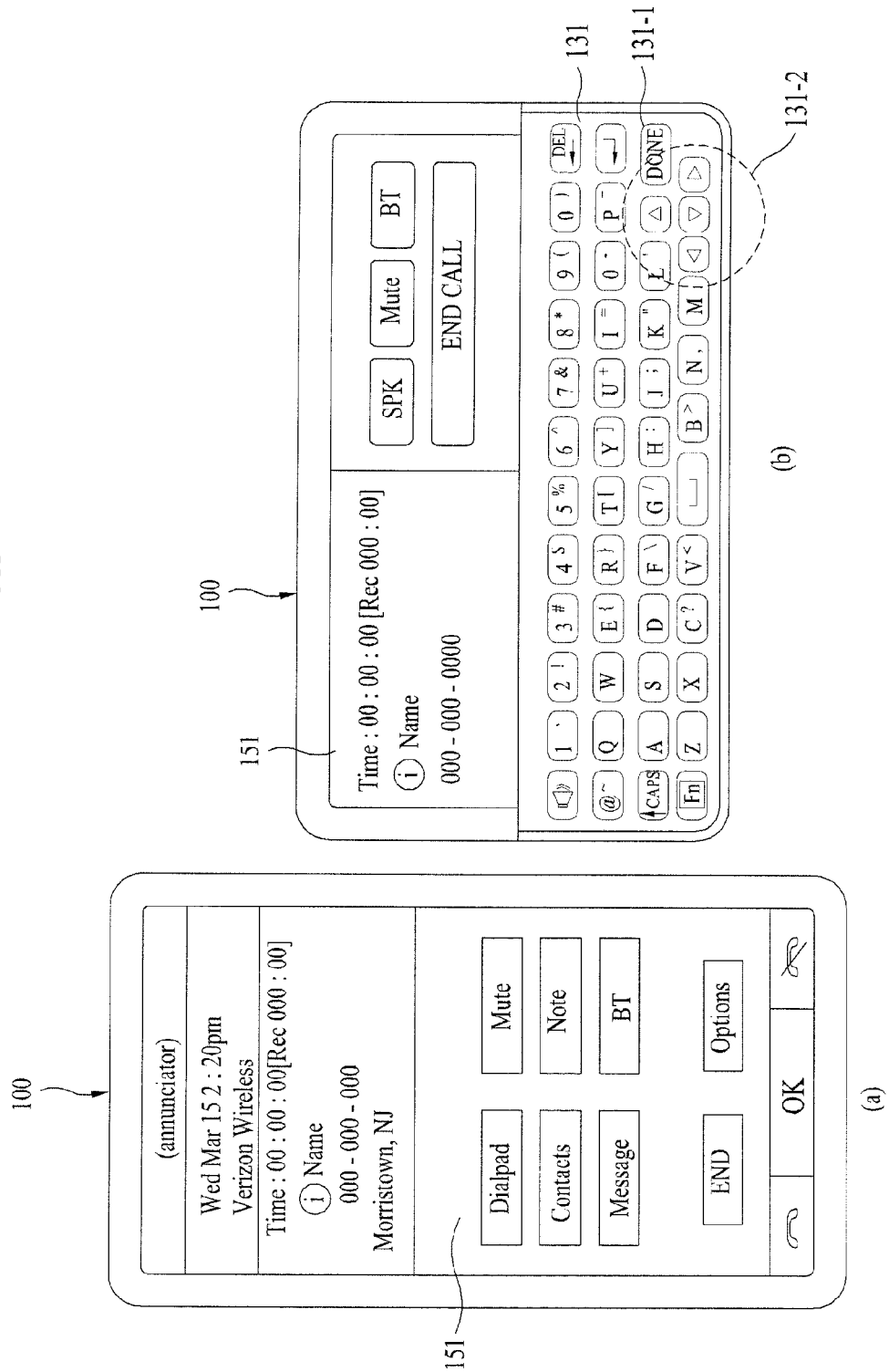
FIG. 18A and FIG. 18B are diagrams of screen configurations for a case that a keypad is positioned to cover a partial display region in a call reception mode according to the present invention.
Figure 18B:
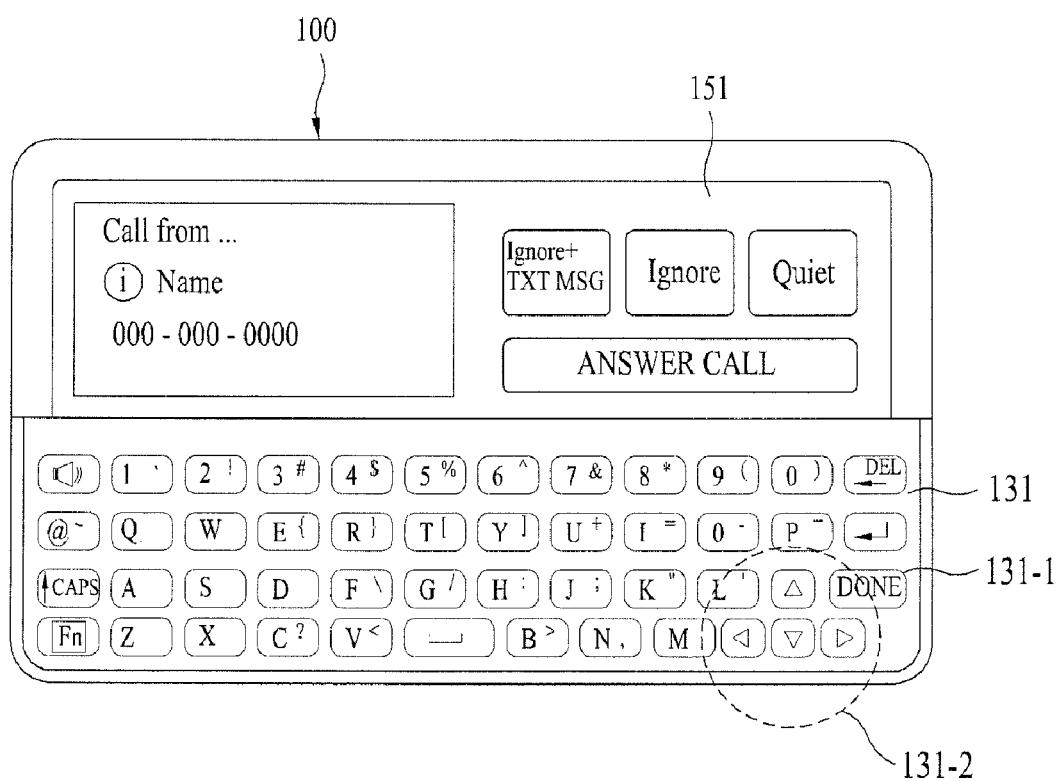

FIG. 18A and FIG. 18B are diagrams of screen configurations for a case that a keypad is positioned to cover a partial display region in a call reception mode according to the present invention.

Referring to FIG. 18A, if a position of the keypad 131 is shifted to cover a partial display region of the display unit 151 in a call reception state (or a call state), the mobile terminal 100 is able to display call reception state indication information (or call state indication information) in a control display mode [b].

Meanwhile, in case of receiving a call in the control display mode, the mobile terminal 100 is able to configure the image shown in FIG. 18B or the like.

According to the present invention, the mobile terminal 100 is able to adjust a data display size according to a data size displayed on a control display region in a control display mode. This is explained with reference to FIG. 19A and FIG. 19B as follows.

Referring to FIG. 19A, the mobile terminal 100 displays data, which is inputted by a user according to a manipulation of the keypad 131, by a first size on a control display region [a]. If three data rows exist, the mobile terminal 100 is able to display the data by reducing it by a second size (smaller than the first size) [b].

Figure 19B:
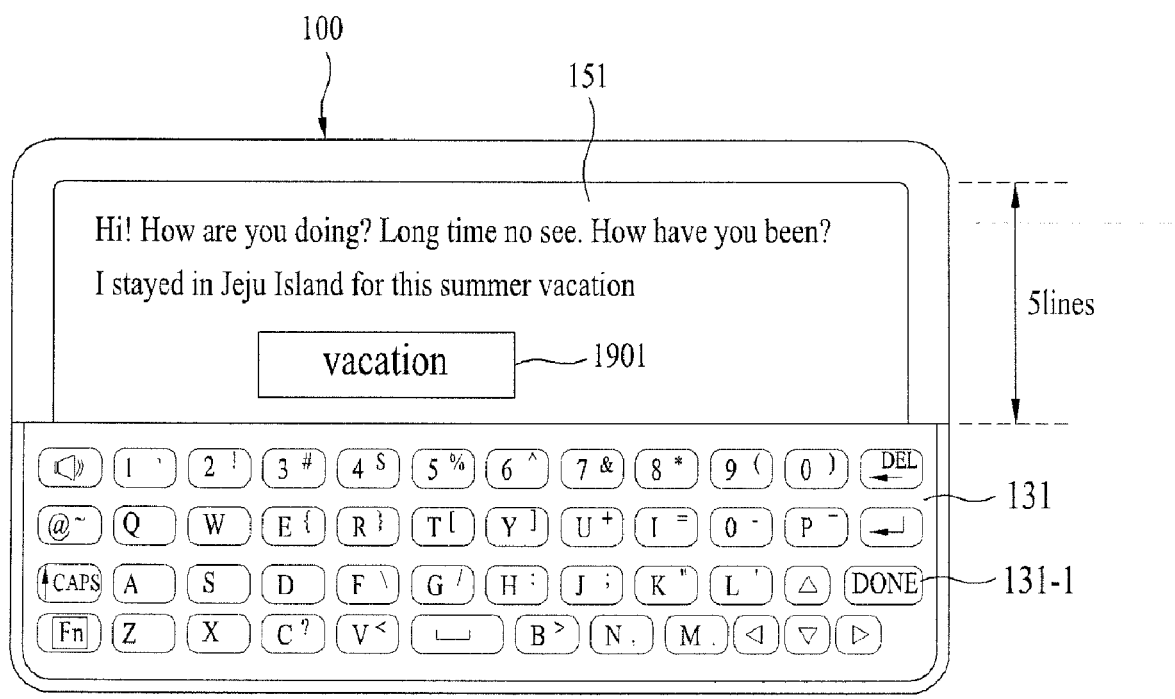

In this case, even if previously inputted data is displayed by the second size, the mobile terminal 100 is able to display currently inputted data by the first size [FIG. 19B].

According to the present invention, in case that the display unit 151 includes a touchscreen, if a normal display mode is switched to a control display mode, the mobile terminal 100 is able to deactivate a touch function of the touchscreen under the control of the controller 180. Therefore, in a control display mode, a user is able to input data using the keypad 131 or may be unable to input data by inputting a touch action to the touchscreen.

According to one embodiment of the present invention, the above-described display controlling method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

In the above-described mobile terminal and display controlling method thereof, the configurations and methods of the above-described embodiments are not limitedly applicable. Instead, the embodiments can be constructed by selective combination thereof entirely or in part to enable various modifications.

Accordingly, the present invention provides the following effects and/or advantages.

First of all, although a keypad is positioned to cover a partial display region of a display unit, a display function can be performed on the rest of the region except the partial display region. Therefore, even if a size of a display region is reduced, the present invention is able to normally deliver specific information to a user through a display function.

Secondly, as a position of a front side of a keypad is shifted in parallel with a front side of a display unit, the present invention facilitates a data input using the keypad.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a display unit configured to display information;
a keypad having a position that can be changed; and
a control unit configured to:
    change a first display mode into a second display mode if the position of the keypad is shifted to cover a partial display region of the display unit, and;
    control the display unit to perform a display operation corresponding to the second display mode in a different display region other than the partial display region,
wherein the first display mode comprises a display unit deactivated mode, a background image display mode or a menu item display mode, and
wherein the display operation corresponding to the second display mode comprises displaying a menu item list including at least one menu item pre-designated to be provided in the second display mode.

2. The mobile terminal of claim 1, wherein the control unit is further configured to control the display unit to display a text input window related to an application corresponding to a specific menu item on the different display region if the specific menu item is selected from the menu item list.

3. The mobile terminal of claim 2, wherein an executed image of the specific menu item is different in the first display mode than in the second display mode.

4. The mobile terminal of claim 1, further comprising:
a user input unit configured to enable a user to pre-designate the at least one menu item to be provided in the second display mode.

5. The mobile terminal of claim 1, wherein:
the first display mode further comprises a specific application driven mode; and
the display operation corresponding to the second display mode further comprises displaying a text input window related to the specific application.

6. The mobile terminal of claim 5, wherein the control unit is further configured to control the display unit to display text input via the keypad on the text input window and to drive the specific application to correspond to the input text.

7. The mobile terminal of claim 5, wherein the text input window is different in the first display mode than in the second display mode.

8. The mobile terminal of claim 1, wherein the control unit is further configured to control a data display size according to a data size displayed in the different display region.

9. The mobile terminal of claim 1, wherein the control unit is further configured to change a display direction of the display unit to a same direction of a key arrangement direction of the keypad if a first position of the keypad having the key arrangement direction vertical to the display direction of the display unit is shifted to a second position to cover the partial display region.

10. The mobile terminal of claim 9, wherein the control unit is further configured to change the second display mode to the first display mode if the position of the keypad returns to the first position.

11. The mobile terminal of claim 1, wherein the display unit includes a touchscreen and the control unit is further configured to deactivate a touch function of the touchscreen as the position of the keypad is shifted to cover the partial display region.

12. A method of controlling a display in a mobile terminal that includes a display unit and a keypad having a position that can be changed, the method comprising:
- detecting whether the position of the keypad is shifted to cover a partial display region of the display unit;
- changing a first display mode to a second display mode if it is detected that the position of the keypad is shifted; and
- performing a display operation corresponding to the second display mode in a different display region other than the partial display region when the second display mode is entered,
- wherein the first display mode comprises a display unit deactivated mode, a background image display mode or a menu item display mode, and
- wherein the display operation corresponding to the second display mode comprises displaying a menu item list including at least one menu item pre-designated to be provided in the second display mode.

13. The method of claim 12, further comprising:
- detecting selection of a specific menu item from the menu item list; and
- displaying a text input window related to an application corresponding to the selected specific menu item on the different display region.

14. The method of claim 12, further comprising:
- enabling a user to predesignate the at least one menu item to be provided in the second display mode.

15. The method of claim 12, wherein:
- the first display mode further comprises a specific application driven mode; and
- the display operation corresponding to the second display mode comprises displaying a text input window related to the specific application.

16. The method of claim 15, further comprising:
- displaying text input via the keypad; and
- driving the specific application to correspond to the input text.

* * * * *